United States Patent
Colafrancesco et al.

(10) Patent No.: US 12,353,643 B2
(45) Date of Patent: Jul. 8, 2025

(54) LOW PROFILE POINTING DEVICE SENSOR FUSION

(71) Applicant: 7Hugs Labs SAS, Montrouge (FR)

(72) Inventors: Julien Colafrancesco, Paris (FR); Nicolas Schodet, Paris (FR)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 17/794,924

(22) PCT Filed: Jan. 28, 2021

(86) PCT No.: PCT/IB2021/050688
§ 371 (c)(1),
(2) Date: Jul. 22, 2022

(87) PCT Pub. No.: WO2021/152513
PCT Pub. Date: Aug. 5, 2021

(65) Prior Publication Data
US 2023/0195242 A1    Jun. 22, 2023

Related U.S. Application Data

(60) Provisional application No. 62/968,543, filed on Jan. 31, 2020.

(51) Int. Cl.
G06F 3/038      (2013.01)
G06F 3/0346     (2013.01)
H04N 21/422     (2011.01)

(52) U.S. Cl.
CPC .......... *G06F 3/0346* (2013.01); *G06F 3/0383* (2013.01); *H04N 21/4222* (2013.01)

(58) Field of Classification Search
CPC ................. G06F 3/0346; G06F 3/0383; G06F 2203/0381; G06F 3/033; G06F 3/038; H04N 21/4222
See application file for complete search history.

(56) References Cited

U.S. PATENT DOCUMENTS 10,068,463 B2    9/2018  Tchedikian
10,871,550 B2   12/2020  Colafrancesco et al.
(Continued)

FOREIGN PATENT DOCUMENTS

EP     2937709 A1   10/2015
EP     3172727 A1    5/2017
(Continued)

OTHER PUBLICATIONS

International Search Report and Written Opinion for International Patent Application No. PCT/IB2021/050688, mailed Apr. 29, 2021, 12 pages.

*Primary Examiner* — Lunyi Lao
*Assistant Examiner* — Jarurat Suteerawongsa
(74) *Attorney, Agent, or Firm* — Withrow & Terranova, P.L.L.C.

(57) ABSTRACT

Methods and systems related to the field of pointing devices are disclosed herein. One disclosed device has a pointing direction, a set of antennas including a first antenna and a second antenna, and at least one of an inertial measurement unit, a gravity sensor, and a magnetometer. The device also includes one or more computer readable media storing instructions which, when executed on the device, cause the device to: determine a difference between a signal as received by the first antenna and the signal as received by the second antenna; determine, using the difference, an angle between the pointing direction and a signal source direction of the signal; measure a physical quantity using the at least one of the inertial measurement unit, the gravity sensor, and the magnetometer; and determine a pointing target of the device using the angle and the physical quantity.

22 Claims, 15 Drawing Sheets

(56) References Cited

U.S. PATENT DOCUMENTS

| | | |
|---|---|---|
| 11,002,820 B2 | 5/2021 | Colafrancesco et al. |
| 2005/0030248 A1* | 2/2005 | Gabriel .................... H01Q 3/26 |
| | | 343/820 |
| 2005/0088337 A1* | 4/2005 | Lorenz ................. H04B 7/0822 |
| | | 342/383 |
| 2010/0123660 A1* | 5/2010 | Park ...................... G06F 3/0346 |
| | | 345/157 |
| 2016/0183057 A1 | 6/2016 | Steiner |
| 2018/0115062 A1* | 4/2018 | Cummings .............. H01Q 3/08 |
| 2019/0097317 A1* | 3/2019 | Di Nallo .............. H01Q 3/2605 |
| 2019/0317177 A1* | 10/2019 | Ertan ...................... G01S 13/75 |
| 2020/0153086 A1* | 5/2020 | Park ...................... H01Q 9/0407 |
| 2021/0127634 A1* | 5/2021 | Griffioen ................. G01P 15/18 |
| 2021/0349177 A1 | 11/2021 | Colafrancesco et al. |
| 2023/0367330 A1* | 11/2023 | Morinaga ............ G05D 1/0268 |

FOREIGN PATENT DOCUMENTS

| | | | | |
|---|---|---|---|---|
| WO | WO-2019231331 A1 * | 12/2019 | ........... | A01K 11/008 |
| WO | WO-2019239365 A1 * | 12/2019 | | |

\* cited by examiner

LOW PROFILE POINTING DEVICE SENSOR FUSION

CROSS REFERENCE TO RELATED APPLICATIONS

This application is a 35 USC 371 national phase filing of International Application No. PCT/IB2021/050688, filed Jan. 28, 2021, which claims the benefit of U.S. provisional application No. 62/968,543, filed Jan. 31, 2020, the disclosures of which are incorporated herein by reference in their entireties.

BACKGROUND

Pointing devices are used for a wide variety of applications. The accurate determination of the pointing direction of this kind of devices plays an important role in their overall performance and practical applicability. To determine the pointing direction, for example with respect to a certain target such as a screen, it would be necessary to locate the position and the orientation of the pointing device with respect to the target, or vice versa. The position and orientation, collectively referred to as the pose, represent a set of six variables. The determination of each of those variables could involve many sensors and considerable processing power. It is expensive and complex to fit enough sensors in a portable device, especially for devices with a small form factor, which is typically the case of pointing devices.

SUMMARY

Methods and systems related to the field of pointing devices are disclosed herein. Systems in accordance with specific embodiments of the invention can include various devices. In the present disclosure, a device that points to another device, object or surface will be referred to as a pointing device, and a device, object or surface that is pointed at by a pointing device will be referred to as a pointing target.

Pointing devices in accordance with specific embodiments of the invention can be used to interact with pointing targets by using a determination of the position and/or the orientation of the device with respect to the pointing target. Pointing devices in accordance with specific embodiments of the invention can involve a determination of the pointing direction of the pointing device in a frame of reference. The pointing device can be a portable device. The pointing target can be a fixed pointing target, such as a fixed surface, screen, or display. The pointing target can be a remote pointing target, such as a remote surface, screen, or display.

In specific embodiments of the invention, a pointing device can interact with a pointing target. In specific embodiments of the invention, the pointing direction of the pointing device can be determined to allow the pointing device to interact with the pointing target or to otherwise identify a pointing target. In specific embodiments of the invention, by determining the pointing direction of the pointing device, an interaction with the pointing target is provided by solving for the intersection of the pointing target and a projection, in the pointing direction, from the pointing device. For example, the pointing device could interact with a screen by a system which determined the pointing direction of the pointing device, solved for the point at which the projection hit the screen, and used that information to display a cursor on the screen.

In accordance with specific embodiments of the invention, a condition for interaction between a pointing device and a pointing target can be determined by providing a set of antennas in the system. For example, a set of at least two antennas can be provided associated with the pointing device. At least two antennas in the set of antennas can be aligned with the pointing direction of the device. In specific embodiments of the invention, the set of antennas associated with the pointing device can receive a signal and, by determining a difference of the signal as received by the antennas in the set of antennas associated with the pointing device, it can be possible to determine an angle between the pointing direction and the source direction of the signal. The difference can be a difference in the phase of the signal. This angle can be referred to as a pointing angle. This angle can indicate the pointing direction of the pointing device.

In specific embodiments of the invention, the pointing target can be associated with at least one antenna. The source of the signal received by the at least two antennas associated with the pointing device can be the at least one antenna associated with the pointing target. In those embodiments, it can be possible to determine the angle between the pointing direction and the line between the pointing device and the pointing target. In specific embodiments of the invention, this angle is a pointing angle. In those embodiments, this angle can indicate the pointing direction of the pointing device with respect to the pointing target.

In specific embodiments of the invention, at least a pair of antennas is associated with the pointing device on one hand, and at least one antenna is associated with the pointing target on the other hand. In specific embodiments of the invention, the distribution of antennas in the system allows a determination of geometric parameters based on localization techniques, such as angle-of-arrival (AOA).

In specific embodiments of the invention, the pointing direction is determined using both the difference in the signal as received by the first and second antennas as mentioned above, and a physical quantity measured by a sensor on the pointing device. The sensor can be an inertial measurement unit (IMU), a gravity sensor, a magnetometer, and various other devices. The physical quantity can be an acceleration of the pointing device, a direction of Earth's gravimetric acceleration of the pointing device, a measurement of magnetic North, and various other quantities that can be used to aid in the determining of the location and/or orientation of the pointing device.

In specific embodiments of the invention, a device is provided. The device comprises a pointing direction, a set of antennas including a first antenna and a second antenna, at least one of an inertial measurement unit, a gravity sensor, and a magnetometer, and one or more computer readable media storing instructions. The instructions, when executed on the device, cause the device to determine a difference between a signal as received by the first antenna and the signal as received by the second antenna. The instructions also cause the device to determine, using the difference, an angle between the pointing direction and a signal source direction of the signal. The instructions also cause the device to measure a physical quantity using the at least one of the inertial measurement unit, the gravity sensor, and the magnetometer and determine the pointing direction of the device using the angle and the physical quantity.

In specific embodiments of the invention, a system is provided. The system comprises a portable device having a pointing direction and a set of antennas including a first antenna and a second antenna, and at least one of an inertial measurement unit, a gravity sensor, and a magnetometer.

The system further includes a third antenna associated with a pointing target and one or more computer readable media storing instructions. The instructions, when executed by the system, cause the system to transmit a signal using the third antenna, determine a difference between the signal as received by the first antenna and the signal as received by the second antenna, determine, using the difference, an angle between the pointing direction and a signal source direction of the signal, measure a physical quantity using the at least one of the inertial measurement unit, the gravity sensor, and the magnetometer, and determine the pointing direction of the device using the angle and the physical quantity.

In specific embodiments of the invention, a method in which each step is computer-implemented is provided. The method comprises obtaining a first sample of a signal on a first antenna and a second sample of the signal on a second antenna, wherein the first antenna and the second antenna are in a set of antennas on a portable device, and wherein the portable device has a pointing direction. The method further comprises determining a difference using the first sample and the second sample. The method further comprises determining, using the difference, an angle between the pointing direction and a signal source direction of the signal. The method further comprises measuring a physical quantity using the at least one of the inertial measurement unit, the gravity sensor, and the magnetometer. The method further comprises determining the pointing direction of the device using the angle and the physical quantity.

BRIEF DESCRIPTION OF THE DRAWINGS

FIG. 9 includes an example of a system comprising a pointing device and a pointing target in the form of a TV screen, including at least one embedded beacon, in accordance with specific embodiments of the invention disclosed herein.

DETAILED DESCRIPTION

Figure 1:
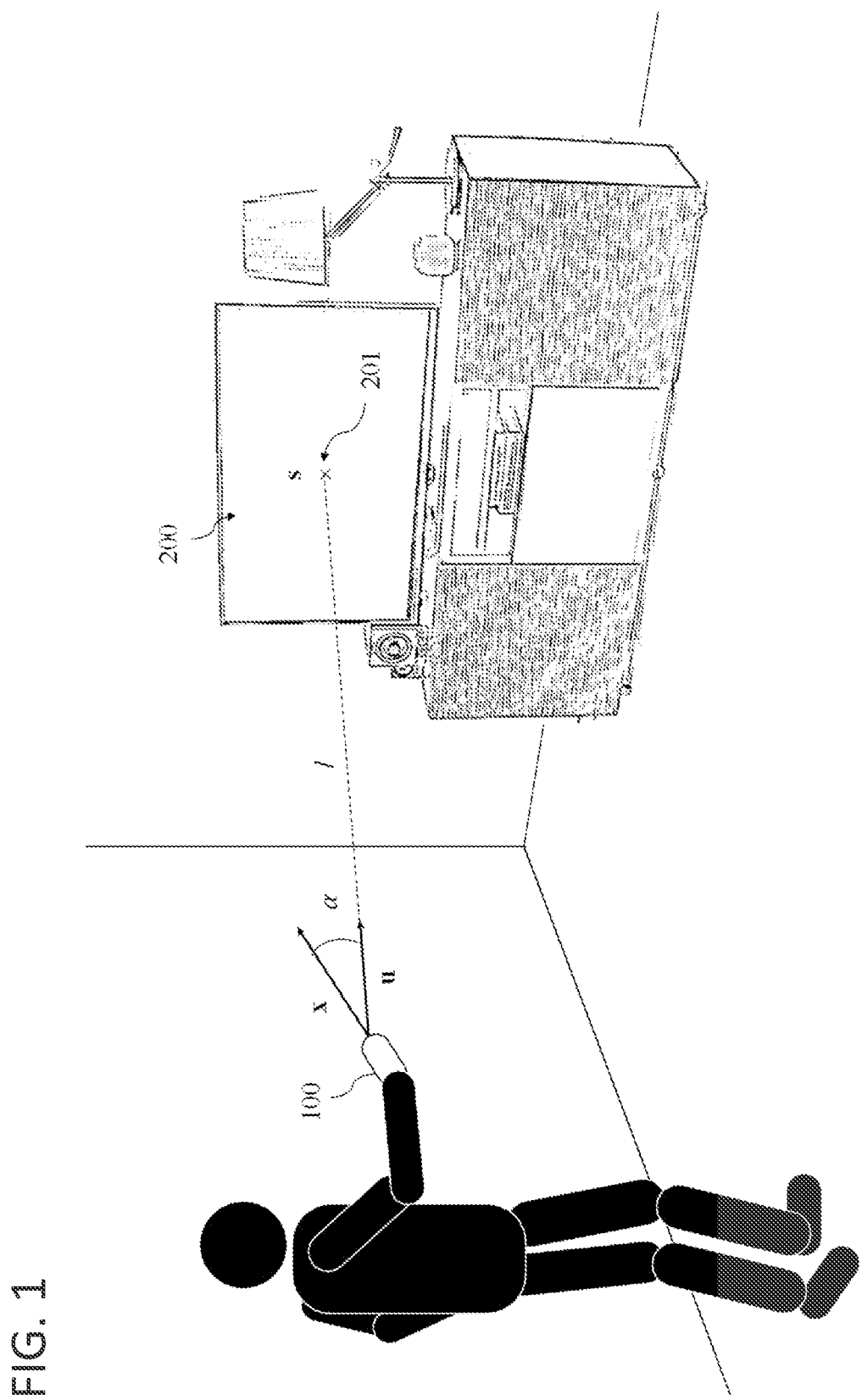
FIG. 1 includes an example of a 3D environment where a pointing device and a pointing target can be used in accordance with specific embodiments of the invention disclosed herein.

Methods and systems related to the field of pointing devices in accordance with the summary above are disclosed in detail herein. The methods and systems disclosed in this section are nonlimiting embodiments of the invention, are provided for explanatory purposes only, and should not be used to constrict the full scope of the invention.

The following patents and patent applications from the same applicant are incorporated by reference herein in their entirety for all purposes: European Patent No. EP3172727B1 entitled "Methods for determining and controlling a piece of equipment to be controlled, and device, use and system implementing said methods"; U.S. Pat. No. 11,002,820 entitled "System for Object Tracking in Physical Space with Aligned Reference Frames" by Julien Colafrancesco, Simon Tchedikian, Nicolas Schodet and Simon Guillot based on U.S. patent application Ser. No. 16/049,074 filed on Jul. 30, 2018; U.S. Pat. No. 10,871,550 entitled "Polarization Axis Attenuation and Cross Polarization Resistant Antenna Orientation Assembly for Tracked Object" by Julien Colafrancesco and Oliver Mandine based on U.S. patent application Ser. No. 16/056,888 filed on Aug. 7, 2018; and U.S. Patent Application Publication No. 2021/0349177 claiming priority to U.S. Prov. Pat. App. No. 63/022,065 entitled "Low Profile Air Mouse, Smart Remote and Telepointer" by Julien Colafrancesco, Simon Tchedikian, Nicolas Schodet filed on May 8, 2020.

Pointing devices in accordance with specific embodiments of the invention can be used to interact with pointing targets. The pointing device can be any device that can point to a pointing target. The pointing device can be a portable device. The pointing device can be used to point at a pointing target, such as a remote screen, in a way that is analogous to a laser diode pointing on a screen. The pointing device can be capable of receiving and/or transmitting radio-frequency signals such as ultra-wide band (UWB) signals.

The pointing device can comprise a main pointing direction. In specific embodiments of the invention, the pointing direction is physically delineated by the device. For instance, the pointing device may include a housing with a longitudinal direction extending more than the other directions, indicative of the main pointing direction. In this way, the pointing device can have a shape that defines a natural pointing direction of the pointing device. For example, the device could be a rectangle with a distinguished short edge where the long side of the rectangle and distinguishing features of that short edge naturally indicated the pointing direction of the object. The pointing direction of the pointing device can be associated with a heading the user aligns a target with when pointing. The pointing device could be configured to transmit signals intended for a pointing target aligned with the pointing direction to fulfill its main functionality.

The signals may be transmitted omnidirectionally or using a directed transmission using beamforming to send a narrow signal in the pointing direction.

The pointing device can be any object, such as a smart phone, a personal user device generally, a remote control, a smart remote, a smart wand, an air mouse, a presentation pointer, a telepointer, an inventory management device, a drone, or a toy. The pointing device could be of any shape, such as a disc, with a pointing direction indicated by an arrow icon on the surface of the device. In other examples, any indicator which allowed a person to determine which way to point a device could be considered as providing the device with a pointing direction as that term is used herein.

The pointing device could be a handheld device, such as a remote control, a smart remote, an air mouse, a game controller, a wand, a cellular telephone, a smart phone, a tablet device, an electronic car key, a digital camera, or flashlight, and the like. The pointing device could be a wearable device wherein the main pointing direction can be the line of sight of the user wearing the wearable device, such as an earpiece device, a headphone device, wireless earbuds, or a virtual/augmented reality headset. The pointing device could be any other wearable device having a natural pointing direction, such as a wrist-watch device (pointing direction can be forearm) or a pendant device (pointing direction can be the line of sight of the user) for instance.

A pointing target can be any surface, device or object that the pointing device can point to. The pointing target could be a remote pointing target. The pointing target could be a physical surface like a wall, or virtual surface, a screen, a display, etc. The pointing target could be a remote screen or remote surface. The remote screen could be a fixed screen, such as a home theater screen, a TV screen, a computer monitor, a surface on a wall (e.g., with a virtual or real object located thereon), a virtual surface, an array of LED lights, a surface mounted display, a digital photo frame, an array of flat panel displays, and the like. Specific examples throughout this disclosure use a remote fixed screen as a possible pointing target. However, the concepts described herein are not limited to that specific kind of pointing target. For example, the same concepts described to explain an interaction between a pointing device and a pointing target being a remote screen, to move a cursor up and down on the screen, can be equally applicable to the scenario of a pointing device moving up and down to control the volume of a pointing target being a speaker.

An interaction can be any action from any device of the system, such as the pointing device or pointing target, that influences other device of the system. For example, an interaction could be displaying a cursor on a screen at the intersection between the pointing direction line of the pointing device and the screen, when the pointing target is the screen. As another example, an interaction could be selecting a pointed object, such as in the case of point and select applications. Other forms of interactions are possible, such as unlocking and controlling a remote computing device connected to a monitor or video projector, remotely controlling a smart television, remotely controlling a set-top box connected to a TV screen, displaying a contextual smart remote user interface based on the identification of the pointed target (real or virtual), determining a piece of equipment to be controlled based on the pointing direction of the pointing device, controlling an audio or video playback based on the pose or/and orientation of the pointing device, and the like. Different applications of the systems and methods disclosed herein will be described in the following disclosure.

The systems disclosed herein can include the pointing device itself, the pointing target itself, or a combination of pointing devices and pointing targets. The system could also include supporting devices, such as a base or charger for the pointing device, and remote devices such as a server or cloud architecture in operative communication with those supporting devices or the pointing device. Throughout this disclosure reference will be made to non-transitory computer readable media storing instructions to allow the disclosed systems to conduct certain actions. In these embodiments, the computer readable media can all be internal to the pointing device. Alternatively, the computer readable media can all be internal to the pointing target. Alternatively, the computer readable media can be distributed across the supporting devices, remote devices, the pointing device, and the pointing target, or they can be entirely located on the supporting devices and/or remote devices.

In specific embodiments of the invention, a system is provided which includes a pointing device with at least two UWB antennas arranged to measure an AOA in a plane and at least an IMU to provide physical data. The AOA and IMU physical data can be combined according to a data fusion technique. The system can also include at least one UWB antenna positioned near or on a pointing target such as a remote screen. An advantage of specific associated embodiments of the invention is that the pointing device can have a thin form factor (i.e., the embodiments can facilitate the use of a thin housing for the pointing device as measured in the vertical direction).

Figure 2:
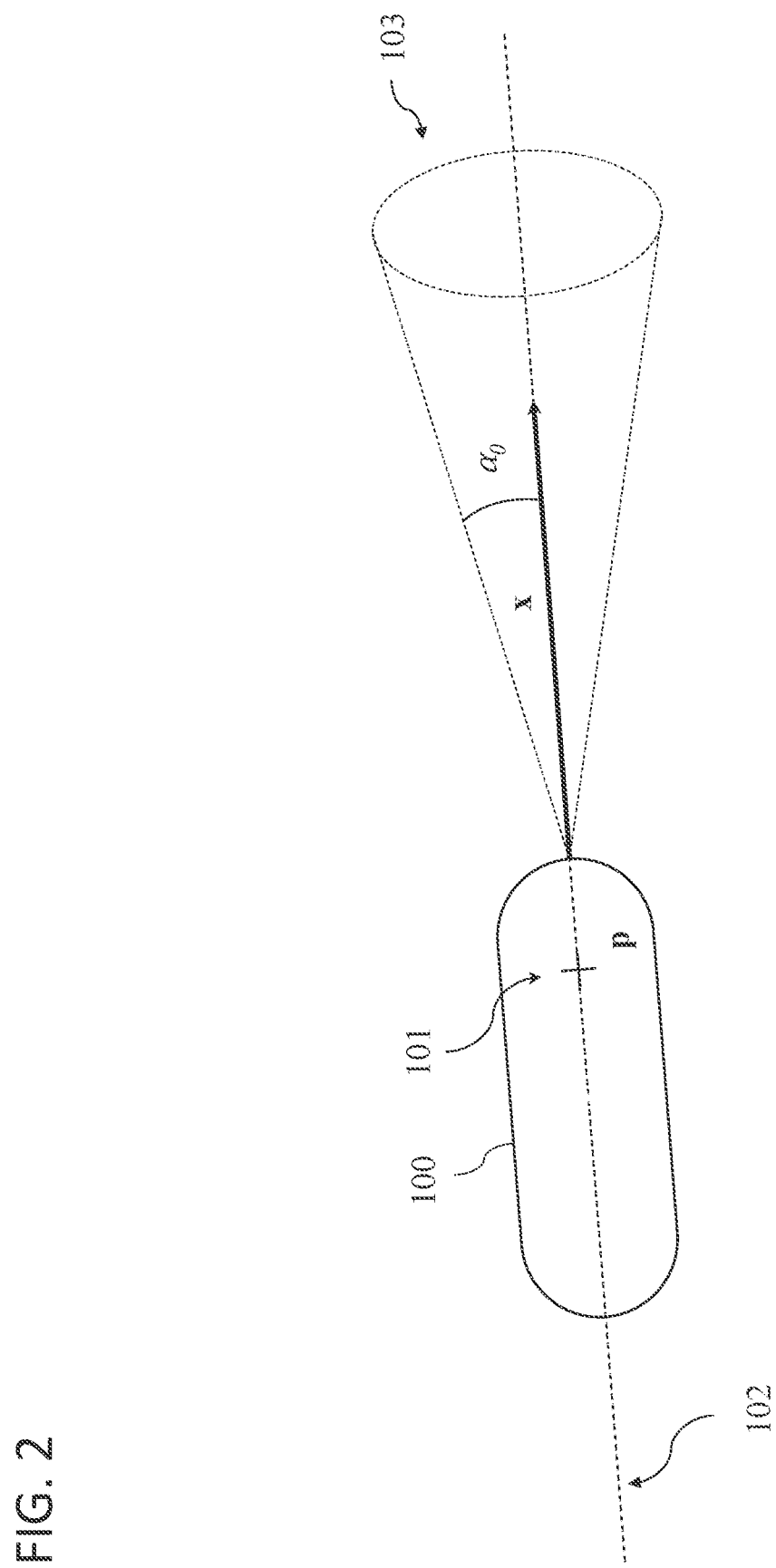
FIG. 2 includes an example of the coordinates system relative to the portable device and selection cone in accordance with specific embodiments of the invention disclosed herein.

FIG. 1 illustrates an example of a 3D environment where a pointing device and a pointing target can be used in accordance with specific embodiments of the present invention. In the example of FIG. 1, the pointing device is the form of a portable device 100, and the pointing target is in the form of a remote screen 200. The portable device 100 is being held by a user and can be used to interact with the remote screen 200 that is positioned in a living room. The pointing direction of the portable device 100 can be determined by using geometrical parameters and a coordinates system. The coordinate system can be linked to the portable device. In specific embodiments of the invention, the coordinate system can be centered on the portable device 100. The coordinate system can be used, for example, to determine the orientation in the space of the portable device 100, relative to the screen 200. FIG. 2 illustrates an example of the coordinates system relative to the portable device and selection cone in accordance with specific embodiments of the invention.

The coordinates system can be centered on a point 101 of the portable device 100, as illustrated in FIG. 2. The point 101 could be located close to the front and centered laterally in the portable device. The point 101 is also referred to as point p in the following disclosure.

Referring now to both FIG. 1 and FIG. 2, the pointing direction of the portable device can be represented by a unitary vector x and, for example, defining a longitudinal direction of the portable device. The position of the screen 200 can be defined by a point s, referenced as point 201 in FIG. 1. In specific embodiments of the invention, the point s is a point of interest 201 of the pointing target or surface. If the surface is a TV screen, such as screen 200, the point of interest 201 could be the center of the screen 200. Alternatively, the point of interest 201 could be located at any other position on the screen or otherwise associated with the pointing target.

In specific embodiments of the invention, the direction of the screen 200 from the to the portable device 100 can be derived from the following equation:

$$u = \frac{s - p}{l}$$

Where:
p is the three-dimensional cartesian coordinates of the point 101; and
s is the three-dimensional cartesian coordinates of the point 201;
l=∥s−p∥ is the distance between s and p; and
u is the unitary vector parallel to the line passing by the point 101 and the point of interest 201, and with a direction from point 101 to point 201.

According to specific embodiments of the invention, the location of the portable device is measured by the distance l between the points 101 and 201, and the unitary vector u.

The angle α formed between vector x and vector u can materialize the pointing angle of the portable device 100 relative to the screen 200.

In vector notations:

cos α=x·u

In matrix notations:

cos α=x$^T$u

Accordingly, in specific embodiments of the invention, when the portable device 100 points exactly to the center of the fixed screen 200, the angle α is null. In other words, the vector x and the vector u are the same.

In the example described above, the pointing direction of the portable device 100 could be limited to a single line. That is a narrow way of assessing that the portable device 100 is pointing exactly to the point of interest 201 of the screen 200.

Still with reference to FIG. 2, a pointing cone 103 can be used to determine a condition of interaction with the pointing target. For instance, the interaction could be the selection or control of an interface or of an object when the portable device is pointing towards the point of interest 201.

The pointing cone in the example of FIG. 2 has a base located in the point 101 (also referred to as point p), an orientation defined by the vector x and an aperture do. The center of the cone can be defined by the axis 102 of the pointing device, which can be aligned with the pointing direction of the pointing device. In specific embodiments of the invention, if the point of interest 201 of screen 200 of FIG. 1 is located inside the pointing cone 103, the pointing device can be deemed pointing at the screen 200. In other words, for any angle α that is smaller than angle $α_0$, the condition of interaction is met. For instance, in a point and select application, the portable device 100 could interact with the screen if the angle α is smaller than the angle $α_0$.

In specific embodiments of the invention, the aperture angle $α_0$ can be a threshold angle, and the pointing device can identify a pointing target based on the pointing angle α and the threshold angle when the pointing angle is smaller than the threshold angle. The threshold angle $α_0$ can be known to the system. For example, the value of the threshold angle can be stored in a memory of the system. The value of the threshold angle can be embedded in instructions stored in a computer readable media of the system for geometrical parameters calculation. The threshold angle can be a tolerance of the system. The threshold angle can be defined by the system manufacturer or set by the user according to the user preferences and tolerance according to the application. The threshold angle can be associated to an area on the pointing target, for example a circular area such as the base of the cone 103, so that when the pointing device is closer to the pointing target, the angle is wider.

In specific embodiments of the invention, both the orientation and the position of the portable device 100 with respect to the screen 200 are important in determining whether a condition of interaction is met.

The pose of the pointing device 100 can be defined as the combination of its position coordinates and its orientation coordinates in the space. Each coordinate (either in position or in orientation) can be presented by three variables to be determined in a 3-dimensional space.

The pose of the pointing device 100 in the 3-dimensional space can therefore be defined with six variables. There can be ambiguity in the pose in a situation in which there is at least one missing coordinate (either in position or in orientation).

Figure 3:
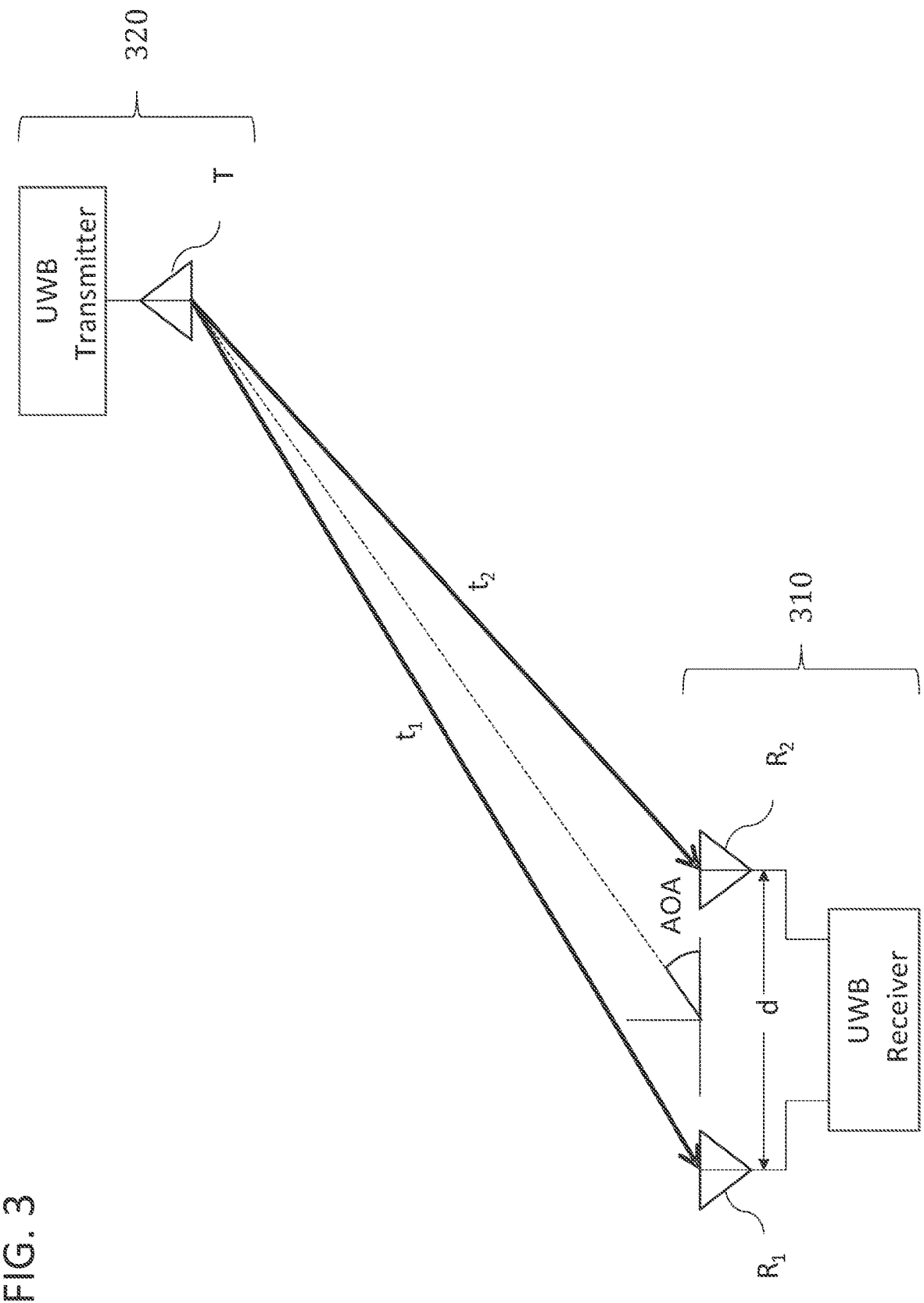
FIG. 3 includes a system with a dual antenna station and a single antenna station in accordance with specific embodiments of the invention disclosed herein.

FIG. 3 illustrates a system in accordance with specific embodiments of the invention. The system can be an UWB system, such as an UWB sensor system. As illustrated in FIG. 3, the system can include a dual antenna station 310 that can be equipped with a chipset (or more) for processing UWB electromagnetic signals received by two antennas R1 and R2 respectively. The antennas R1 and R2 are separated by a distance d.

The dual antenna station can also be referred to as an AOA system, a UWB tag or a UWB node depending on the functional role it plays in the system. As will be described in more detail below, the dual antenna station can be attached to, or positioned in, or near to, or otherwise associated with the pointing object in a system according to specific embodiments of the invention.

As also illustrated in FIG. 3, the UWB sensor system can include a single antenna station 320 equipped with a chipset for generating an UWB electromagnetic signal for transmission by an antenna T. As will be described in more detail below, the single antenna station can be attached to, or positioned in, or near to, or otherwise associated with a pointing target such as a remote screen in a system according to specific embodiments of the invention. The antenna can be, for example, embedded in the electronic board of a TV screen.

In a system as the one illustrated in FIG. 3, a measurement of an Angle of Arrival (AOA) can be performed. A first localization technique, known as Time Difference of Arrival (TDoA), can be used to derive an AOA. The ultra-wide band electromagnetic waves transmitted by the single antenna station 320 via its antenna T can be received in direct line of sight by each antenna R1 and R2 of the dual antenna station 310 at a respective time t1 and t2. The time difference multiplied by the speed of light provides a distance between the single antenna station (the antenna T) and each of the antennas (R1 and R2) of the dual antenna station. The same AOA measurement could be performed with a system with more antennas on either side. For instance, the dual antenna station and/or the single antenna station could be replaced by an array of antennas.

Alternatively, a range-based localization can be achieved in two steps with a Time-of-Arrival (TOA) approach. A first step could include range measurements based on TOA estimations. The TOA of the signal can be estimated coherently by correlating the received signal with a template, or non-coherently by detecting the time when the received signal energy exceeds a threshold. The estimated TOA can be converted to relative or absolute ranges. For instance, the position of the transmitting antenna (T) can be determined with an iterative computation by minimizing an error function.

Another technique, known as Two Way Ranging (TWR), uses the transmission of other messages over ultra-wide band electromagnetic waves. It is a way to convert multiple time of arrivals measured by the different stations into a time-of-flight measurement.

Figure 4:
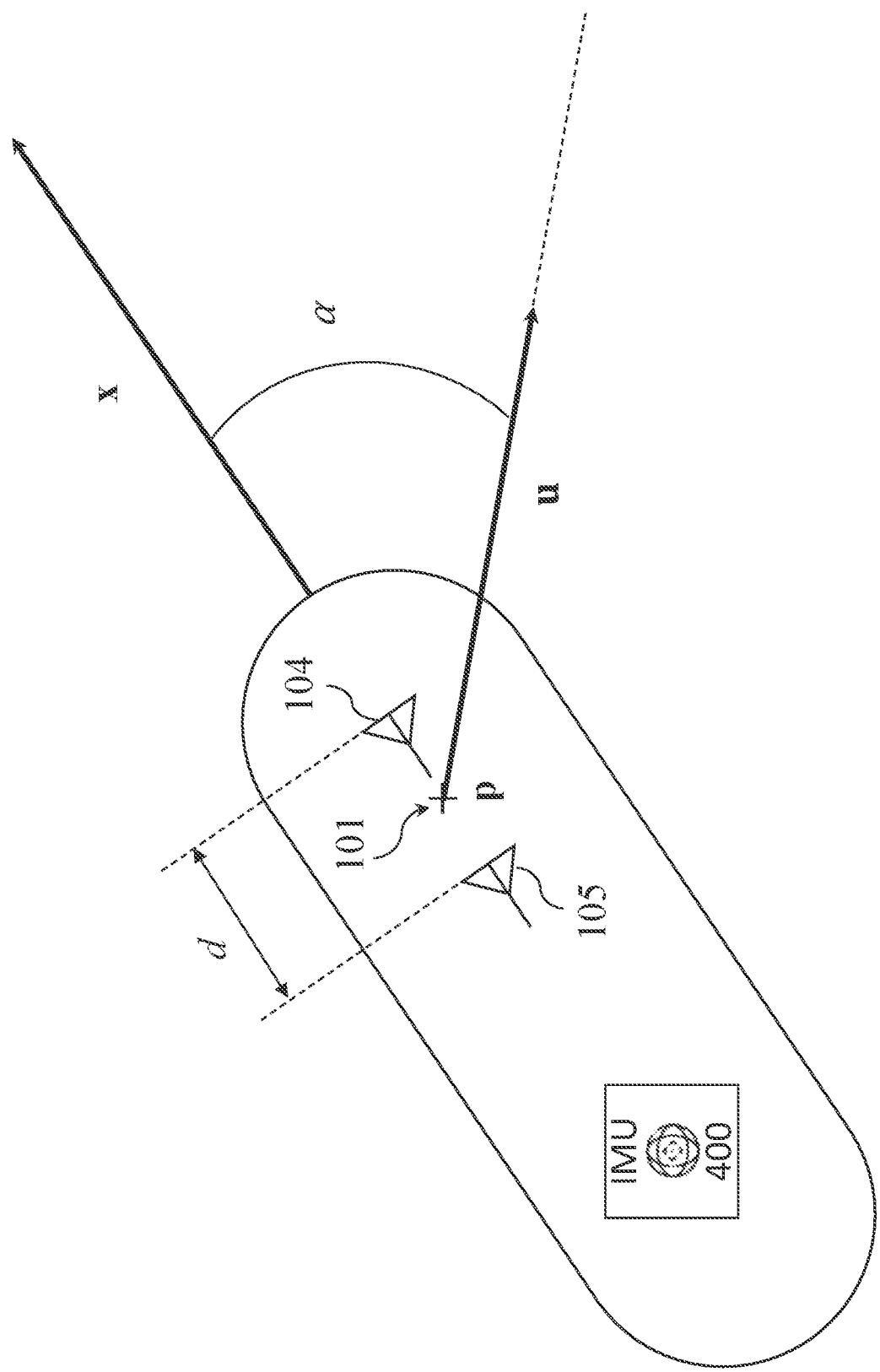
FIG. 4 includes an example of a pointing device with an antenna configuration and IMU in accordance with specific embodiments of the invention disclosed herein.

In specific embodiments of the invention, the pointing device comprises a set of antennas and an inertial measurement unit (IMU) (e.g., IMU 400 in FIG. 4). In alternative embodiments, the IMU can be replaced or used in combination with one or more of an accelerometer, a gravity sensor, and a magnetometer. An example of the configuration of antennas of the pointing device in accordance with specific embodiments of the invention can be explained with reference to FIG. 4 which illustrates a two-dimensional representation in the plane passing through the point 101 of the portable device, and parallel to both vectors u and vector x. In the example of FIG. 4, the portable device comprises a front antenna 104 and a rear antenna 105, configured for receiving and/or transmitting signals, such as UWB radio signals. These antennas in the example of FIG. 4 are substantially aligned with the pointing direction defined by vector x. The antennas can be aligned with the pointing direction in that a line connecting a center of the first antenna to a center of the second antenna is parallel with the pointing direction. The antennas can be arranged so that the point 101, introduced with reference to FIG. 2, is located in the middle of antenna 104 and antenna 105.

As illustrated in FIG. 4, the two antennas are also positioned approximately in the same horizontal plane of the pointing device. As such, the thickness of the pointing device in a vertical direction can be minimized. However, the location of the antennas in the same plane can lead to ambiguities as to the pointing direction of the pointing device as determined by the positioning system. However, using some of the approaches disclosed herein, such as particular calibration methods, the utilization of additional antennas or arrays of antennas, and/or the inclusion of additional physical data such as that measured by an IMU or magnetometer, can resolve these ambiguities.

In specific embodiments of the invention, this particular configuration of antennas allows to a greater tolerance to an ambiguity in position or/and in orientation of the pointing device for certain interactions, such as "point and control" or "point and select" interactions. In specific embodiments of the invention, the particular configuration of the pointing device, to measure the angle $\alpha$, allows for a determination of the condition of interaction without requiring a full resolution of all the variables that would otherwise be needed to determine both the pose and location of the portable device. For example, the particular configuration of antennas could allow for the determination of geometrical parameters with techniques such as angle-of-arrival in order to determine angle $\alpha$, and thus determine a condition of interaction.

In specific embodiments of the invention, the system can be an Ultra-Wideband (UWB) sensor system. Ultra-Wideband (UWB) is a short-range radio technology which can be used for indoor positioning. The enlarged spectrum bandwidth of UWB technologies allows a very good discrimination of the signal time of arrival. This very good time discrimination allows a very good Time of Flight (TOF) estimation and, as of today, distances estimation with errors limited to just a few centimeters in contrast to Bluetooth Low Energy and Wi-Fi. Said in another way, the positioning can be done with a transit time methodology (TOF) instead of the measurement of signal strengths (Receive Signal Strength Indicator or RSSI). Although an UWB sensor system is disclosed in specific embodiments of the invention, the invention is applicable to other systems and radio technologies.

UWB radio signals typically have a fractional bandwidth greater than 20% or absolute bandwidth larger than 500 MHz. Due to its extremely short pulse duration, UWB can be a promising technology for low power and precise ranging and positioning applications in indoor environments. This could allow for an efficient use of scarce radio bandwidth while enabling both high data rate personal-area network (PAN) wireless connectivity as well as longer-range, low data rate applications, and radar and imaging systems.

UWB was traditionally accepted as pulse radio, but the FCC and ITU-R now define UWB in terms of a transmission from an antenna for which the emitted signal bandwidth exceeds the lesser of 500 MHz or 20% of the center frequency. Thus, pulse-based systems—where each transmitted pulse instantaneously occupies the UWB bandwidth, or an aggregation of at least 500 MHz worth of narrow band carriers, for example in orthogonal frequency-division multiplexing (OFDM) fashion—can gain access to the UWB spectrum under the rules. Pulse repetition rates may be either low or very high. Pulse-based radars and imaging systems tend to use low repetition rates, typically in the range of 1 to 100 megapulses per second. On the other hand, communications systems favor high repetition rates, typically in the range of 1 to 2 giga-pulses per second, thus enabling short-range gigabit-per-second communications systems. Each pulse in a pulse-based UWB system can occupy the entire UWB bandwidth, thus reaping the benefits of relative immunity to multipath fading (but not to intersymbol interference), unlike carrier-based systems that are subject to both deep fades and intersymbol interference.

A system in accordance with specific embodiments of the present invention can include a portable system (such as a portable UWB system), attached to, or positioned in or near to, or otherwise associated to, the pointing device 100. The system can also include a fixed system (such as a fixed UWB system), attached to, or positioned in or near to, or otherwise associated to, the pointing target, such as the fixed screen 200. In specific embodiments of the invention, the portable system can be associated to the dual antenna station described with reference to FIG. 3 and the fixed system can be associated to the single antenna station described with reference to FIG. 3. The systems are defined as portable and fixed to differentiate them throughout this disclosure, being the portable associated to the pointing device and the fixed associated to the pointing target, in accordance with specific embodiments of the invention. However, this should not be considered a limitation of the invention. The pointing target could be a non-fixed target and the pointing device could be a non-portable device. The pointing target could be a non-fixed target and the pointing device could be a fixed device, for example, for identifying or locating pointing targets. This and other variations of the systems disclosed herein are also included within the scope of the present invention.

Figure 5:
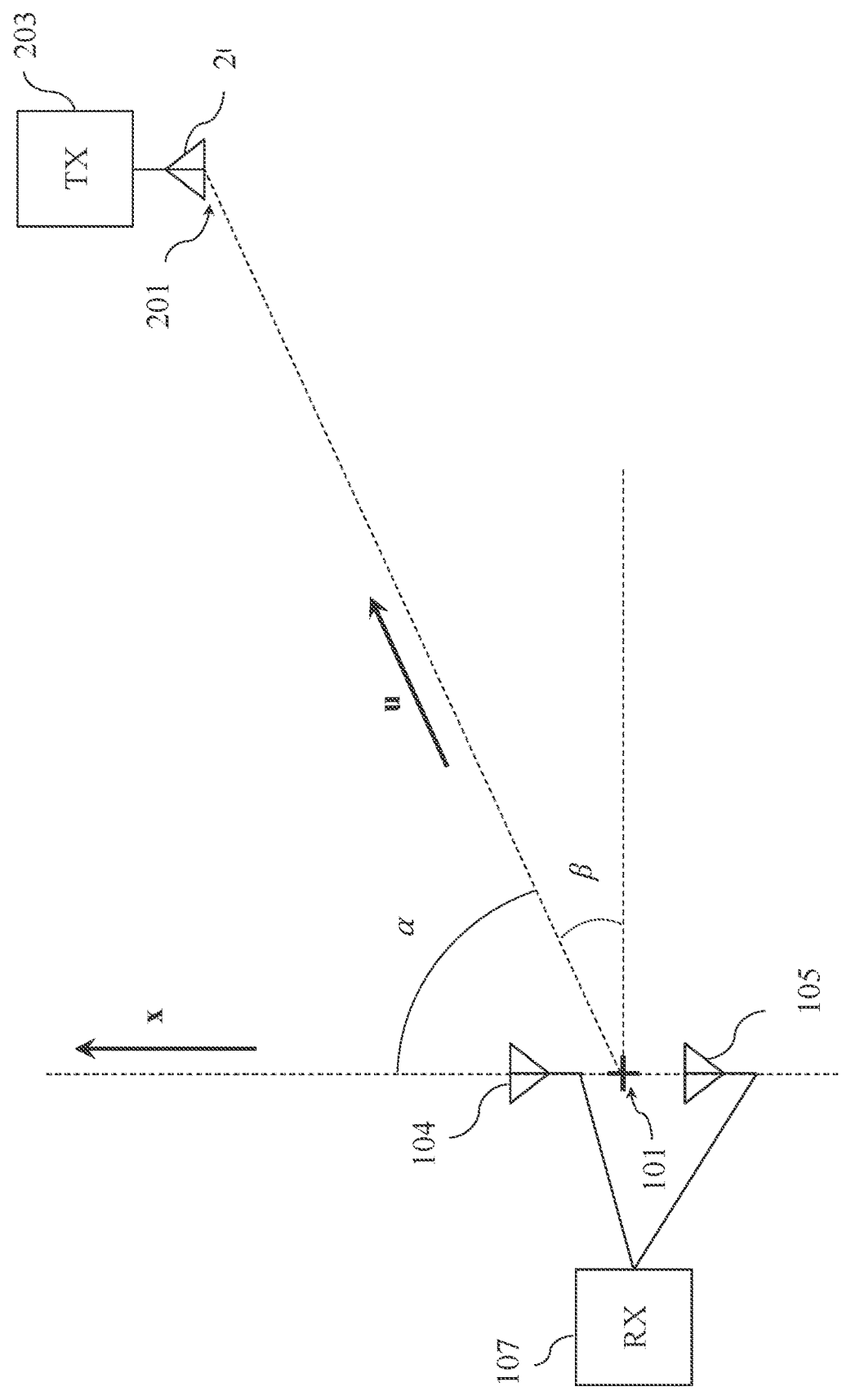
FIG. 5 includes a system for a pointing device and a pointing target in accordance with specific embodiments of the invention disclosed herein.

As illustrated in FIG. 5, the portable system can comprise a receiver 107 (such as a UWB receiver), connected to the antennas 104 and 105. The antennas 104 and 105 can be UWB antennas. The receiver 107, and antennas 104 and 105, can correspond to the dual antenna station described with reference to FIG. 3. The portable system can also include a chipset or more (not shown) for processing electromagnetic signals (such as UWB electromagnetic signals) received by the two antennas. In specific embodiment of the invention, the receiver 107 can be a transceiver or a transmitter. The portable system can also include a computer readable media storing instructions to be executed by the system to execute the intended functions.

The fixed system can comprise a transceiver 203 (such as a UWB transceiver) connected to at least one antenna 202 (such as and UWB antenna). The transceiver 203, and antenna 202, can correspond to the single antenna station described with reference to FIG. 3. The fixed system can also include a chipset or more (not shown) for generating electromagnetic signals (such as UWB electromagnetic signals) to be transmitted by the antenna 202. In specific embodiment of the invention, the transceiver 203 can be a receiver or a transmitter. The fixed system can also include a computer readable media storing instructions to be executed by the system to execute the intended functions.

In specific embodiments of the invention, an angle β represents an angle-of-arrival, which can be the angle between the direction of the incident electromagnetic signal transmitted by the fixed system, and the plane of all points that are at equal distance between the antennas 104 and 105. The angle-of-arrival 6 is represented in the illustrations in the two-dimensional plane passing through the point 101 of the portable device, and parallel to both vector u and vector x. The angle α can be deducted from the measurement of the angle-of-arrival 6 with the following formula:

$$\alpha = \frac{\pi}{2} - \beta$$

It is possible to perform an equivalent angle-of-arrival measurement with a system having more antennas on either side. For instance, the pointing device (or portable device) antennas and/or the pointing target (or fixed surface) antenna could be replaced by an array of antennas. In case of an array of antennas, on receiver 107, the point 101 could be defined as the center of gravity of the field generated by the antennas in the pointing device 100. In a similar fashion, on transceiver 203, the point 201 could be defined as the center of gravity of the field generated by the antennas on the pointing target, such as fixed screen 200.

Figure 6:
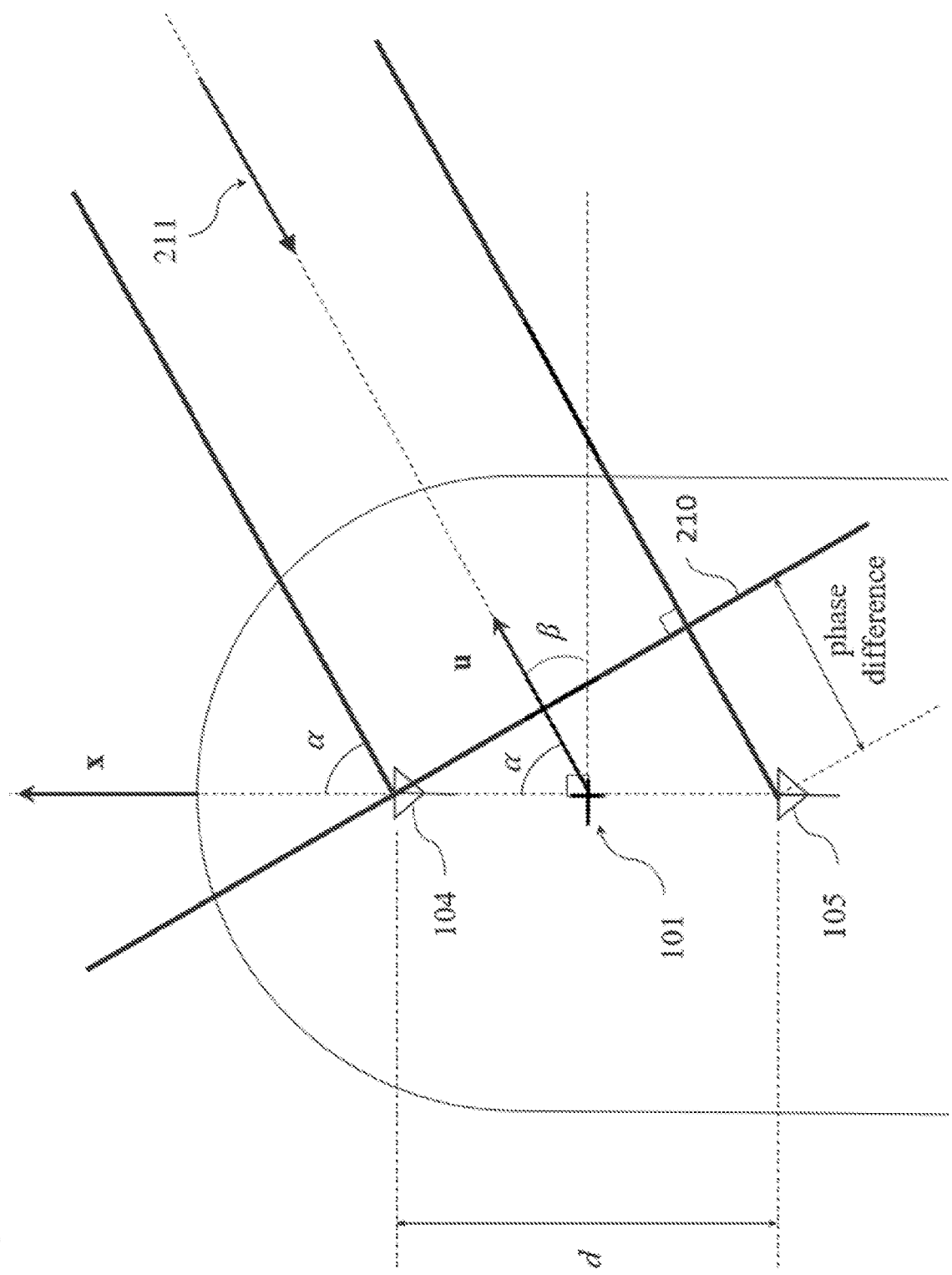
FIG. 6 includes a representation that illustrates the relationship between angle-of-arrival (AOA), pointing direction and position of the pointing device in accordance with specific embodiments of the invention disclosed herein.

FIG. 6 illustrates the relationship between angle-of-arrival (AOA), pointing direction and position of the pointing device. FIG. 6 illustrates an incident wavefront under far-field assumption where the distance d between both antennas 104 and 105 can be negligible in comparison to the distance between the pointing device 100 and the pointing target 200. The direction of the incident electromagnetic signal transmitted by the fixed system is represented by arrow 211. In this situation, an electromagnetic wave transmitted by the transceiver 203 via the antenna 202 can be received as an incident wavefront by the receiver 107 via the antennas 104 and 105.

Then, a measure of the phase difference between antennas 104 and 105 can be used to derive the measure of the angle-of-arrival when the two antennas are organized along the pointing direction of the pointing device:

$$\psi_2 - \psi_1 = \frac{2\pi d}{\lambda}\cos\alpha \pm 2k\pi$$

where:
  k is an integer;
  $\psi_1$ is the measure of the phase of a determined electromagnetic wave on antenna 104, not to be confused with φ (lower case) representing an angle; and
  $\psi_2$ is the measure of the phase of the same determined electromagnetic wave on antenna 105.

A calculation yields:

$$\cos\alpha = \frac{\lambda}{2\pi d}(\psi_2 - \psi_1) \text{ modulo } 2\pi$$

In specific embodiments of the invention, by placing the antennas in the pointing device aligned with the pointing direction of the device, it is possible to determine a condition of interaction, for example whether the device is pointing to a certain target or not, by determining the geometrical parameters such as angles α and/or β rather than a full set of coordinates. This approach can be different than others where the antennas are located, for example, side by side on an axis perpendicular to the pointing direction, where there may be no phase difference between the antennas when the pointing device is tilted, requiring the addition of a third antenna in a different plane to complete the measurements or other solution to determine a pointing angle or pointing direction of the device.

In specific embodiments of the invention, it is possible to use a system such as the one described with reference to FIG. 5 and FIG. 6 to determine the difference between the phase of a signal as received by each antenna in the pointing device, such as antennas 104 and 105. This phase difference could be used to determine an angle of interest, such as angles α and/or β. The angles could indicate a pointing direction of the pointing device, and/or be used in the identification of pointing targets, points of interests or otherwise be used to set an interaction between devices. In specific embodiments of the invention, the system can determine a pointing target of the pointing device using a comparison of a signal received from a source associated with the pointing target. The system can include computer readable media storing instructions to cause the system to execute the above-mentioned determinations. The system could also include phase detection circuitry and hardware for the processing of the received signal to obtain the necessary data to proceed with the angle-of arrival calculations.

Figure 7A:
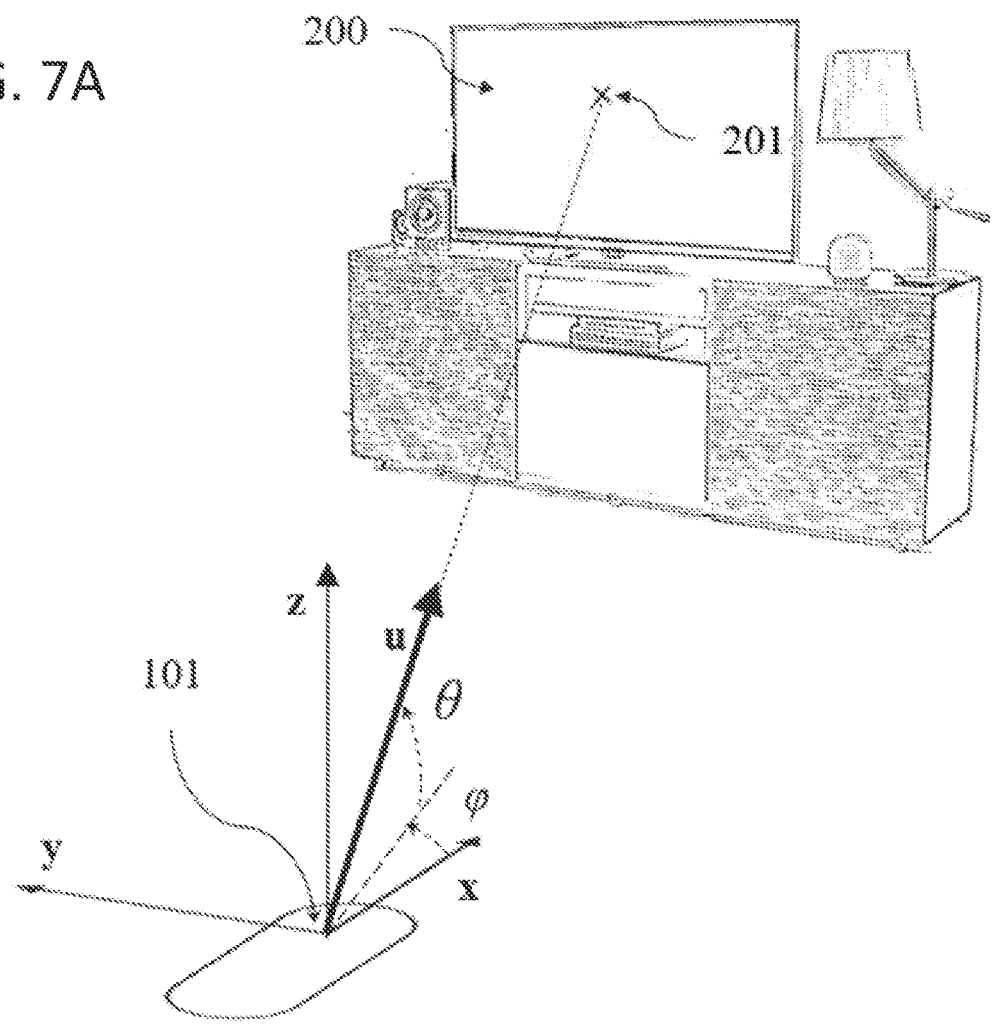
FIG. 7A includes an example of the spherical coordinate system and cartesian coordinate system of the pointing device in accordance with specific embodiments of the invention disclosed herein.

FIG. 7A illustrates an example of the spherical coordinate system and cartesian coordinate system of the pointing device. FIG. 7A illustrates an azimuth angle $\varphi$ (not to be confused with the phase value introduced above and received by the antennas), and elevation angle $\theta$.

The pointing angle $\alpha$ can be viewed as a combination of the azimuth angle $\varphi$ and the elevation angle $\theta$. In a non-spherical/polar coordinates system centered on the pointing device 100, it can be possible to define a cartesian coordinate system formed by three axes x, y and z and centered on point 101:

the x-axis could correspond to the longitudinal axis of the pointing device;
the y-axis could correspond to a lateral axis of the pointing device, and
the z-axis could correspond to a vertical axis of the pointing device, in the sense that this axis could correspond to the upper direction with respect to the pointing device (and not the Earth).

In specific embodiments of the invention, those axes can be centered on the portable device p and can be linked to inertial measurement units (IMUs), including for instance gyroscopes to measure an angular speed.

Figure 7B:
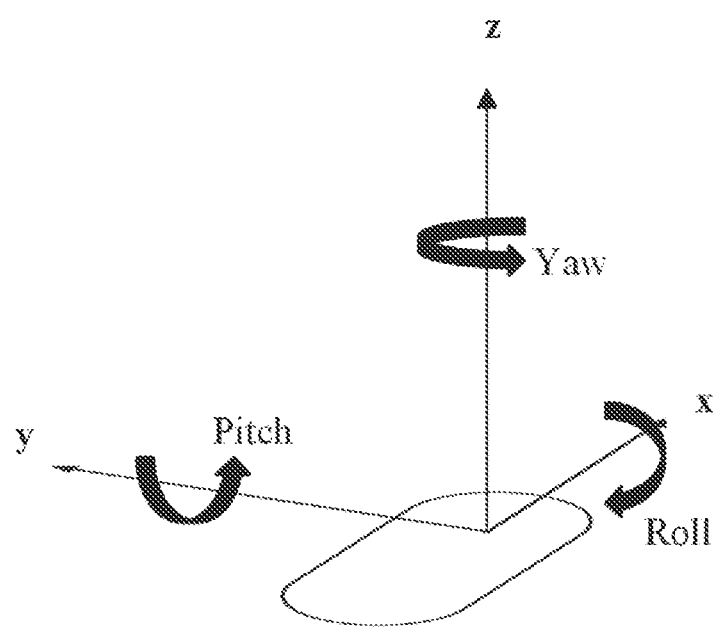
FIG. 7B illustrates the yaw, pitch and roll angles that can be associated with the three axes x, y and z introduced in FIG. 7A, in accordance with specific embodiments of the invention disclosed herein.

FIG. 7B illustrates the yaw, pitch and roll angles that can be associated with the three axes x, y and z introduced above. The roll angle can correspond to a rotation around the longitudinal x-axis of the pointing device. The pitch angle can correspond to a rotation around the lateral y-axis of the portable device. The yaw angle can correspond to a rotation around the vertical z-axis of the portable device.

Figure 8A:
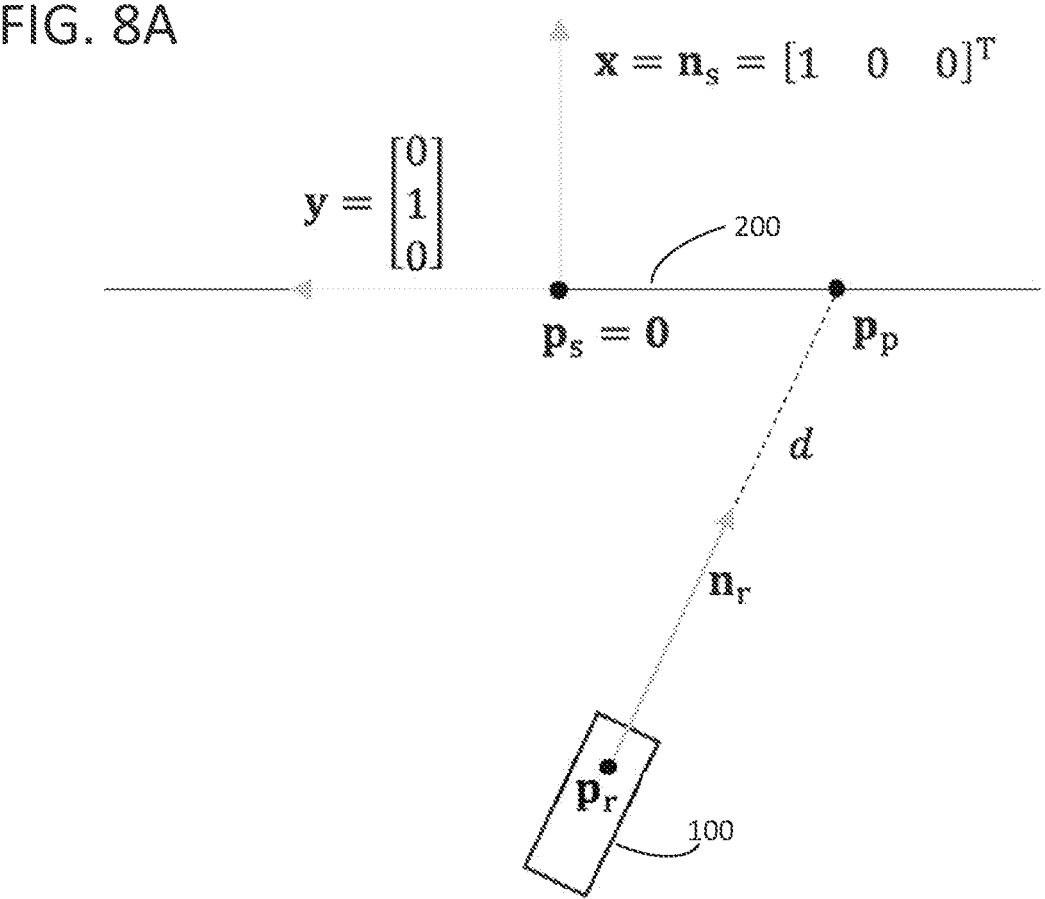
FIG. 8A includes a coordinates system that can be used to explain the definitions used for a model predicting the performance and behavior of a pointing device using raw UWB measurements, in accordance with specific embodiments of the invention disclosed herein.

FIG. 8A illustrates a coordinates system that can be used to explain the definitions used for a model predicting the performance and behavior of a pointing device using raw UWB measurements.

In the example of FIG. 8A, a reference frame can be defined with:

The coordinate $p_s=[0\ 0\ 0]^T$ as a pointing target reference position, such as a screen tag position.
The vector $n_s=[1\ 0\ 0]^T$ as the normal vector to the pointing target, such as the screen surface.
The vector $z=[0\ 0\ 1]^T$ derived from x and y following the right-hand rule Furthermore:
$p_r$ is the position of the pointing device.
$n_r$ is the pointing direction of the pointing device.
The projection point $p_p$ of the pointing device on the pointing target, which can represent, for example, the location of a cursor on a screen when the screen is the pointing target, can be determined by the formula:

$$p_p = p_r + d n_r,$$

with $$d = \frac{n_s^T p_r}{n_s^T n_r}.$$

Figure 8B:
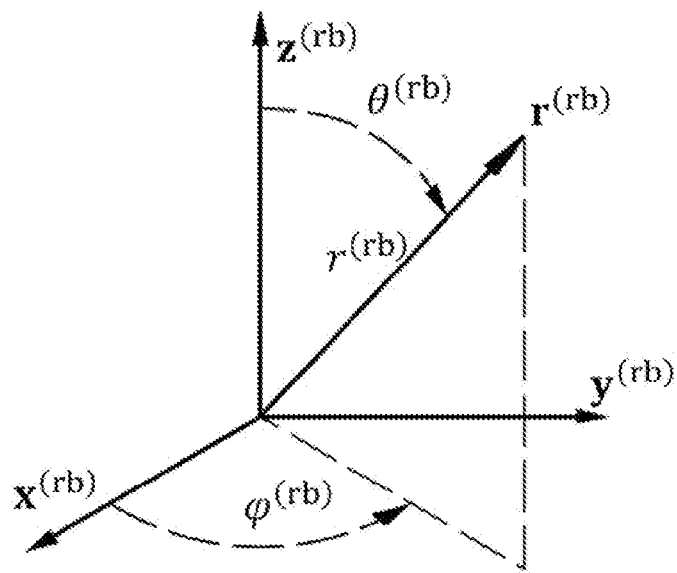
FIG. 8B includes a polar coordinates system centered on a remote body frame of the pointing device, in accordance with specific embodiments of the invention disclosed herein.

FIG. 8B illustrates a polar coordinates system centered on the pointing device. The polar coordinates system illustrated in FIG. 8B can be used to represent the position of the pointing target, such as a screen, in a coordinate system centered for example on a remote body frame of the pointing device. This body frame can be fixed with respect to its mechanical structure. For the sake of clarity, all coordinates considered in this frame have been represented with (rb) as upper indices.

In this frame, $x^{(rb)}$ can be associated to the pointing direction of the pointing device, and the plane containing $x^{(rb)}$ and $y^{(rb)}$ can be associated with the PCB plane of the pointing device, $q^{(rb)}$ and $\theta^{(rb)}$ are respectively the azimuth and elevation of the point of interest, for example the TV screen in the specific examples given in this disclosure.

The pose of the portable device 100 can be a combination of its position coordinates and its orientation coordinates in a three-dimensional space. Each position or orientation can be represented with three variables. The pose of the portable device 100 in the 3-dimensional space can therefore be defined via six variables. As explained before, there may be an ambiguity in a situation in which there is at least one missing coordinate. Ambiguity can be a situation in which there is at least one missing coordinate (either in position or in orientation) of the pointing device 100.

In specific embodiments of the invention, for variables related to the pointing device 100 orientation, it can be determined whether the portable device goes left or right (via the measure of the azimuth angle $\varphi$), and up or down (via the measure of the elevation angle $\theta$).

In specific embodiments of the invention, a precise value of the pointing angle is not necessary to be determined. For example, in the case of certain applications where the condition for interaction is met when the absolute pointing angle is smaller than a threshold, regardless of where exactly the user pointed to around the point of interest, only the absolute value of the pointing angle would be enough to determine the condition of interaction.

In specific embodiments of the invention, it can be desired to obtain a more precise information as to the position and pointing direction of the pointing device. In specific embodiments of the invention, it can be desired not only to determine a condition of interaction but also to determine the exact position of the pointing device with respect to the pointing target, with no ambiguity. In specific embodiments of the invention, the precise pointing direction could be determined by a combination of the antenna configuration described above, specific calibration procedures, and additional measurements. In specific embodiments of the invention, additional antennas, sensors and the calculation of additional geometrical parameters can afford more accuracy to the measurements. For example, additional transmitting antennas associated with the pointing target could be used to determine second, third, or more angles to thereby obtain an increasing degree of information concerning the precise pointing direction of the pointing device. As another example, additional receiving antennas associated with the pointing device could be used to determine additional angles to thereby obtain an increasing degree of information concerning the precise pointing direction of the pointing device. As another example, sensor fusion with other sensors such as magnetometers, gyroscopes, and IMUs could be used to determine the precise pointing direction of the pointing device. These three classes of approaches could also be used in combination to increase the accuracy of the system.

As explained before, the pointing device can include or be attached to at least two UWB antennas, such as an array of UWB antennas or a pair of UWB antennas. The antennas can be configured to minimize the vertical thickness of the pointing device with the UWB antennas. For instance, the UWB antennas may be positioned approximately in a horizontal plane of the pointing device. In specific embodiments, the pointing device, and or the pointing target can include additional antennas to resolve ambiguities in the pointing direction or increase the accuracy of the pointing direction determination.

Figure 9B:
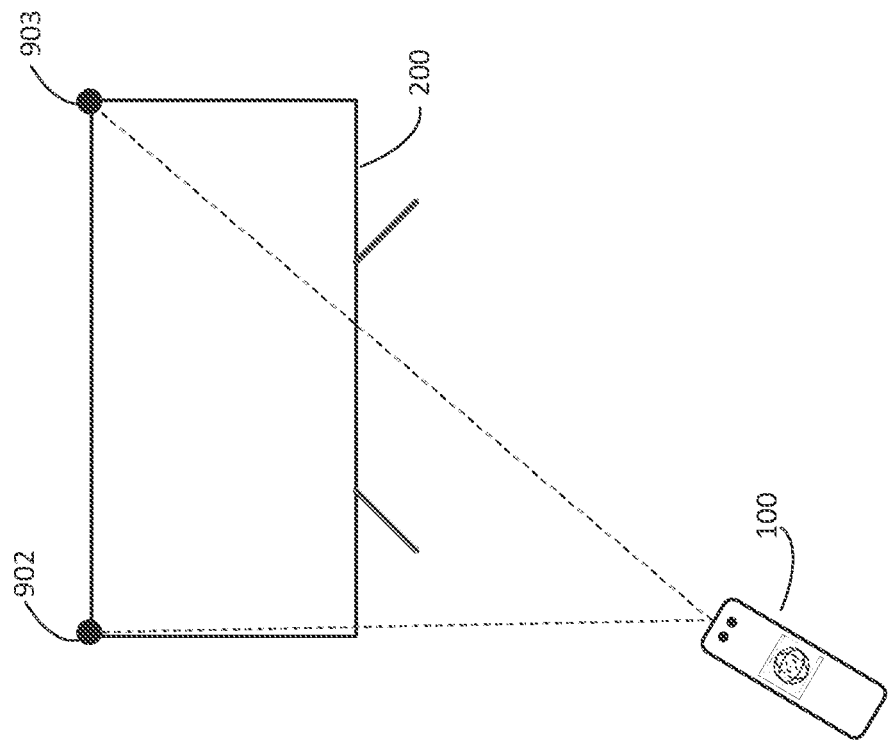
FIG. 9B includes an example of a system comprising a pointing device and a pointing target in the form of a TV screen, including at least two embedded beacons, in accordance with specific embodiments of the invention disclosed herein.
Figure 9A:
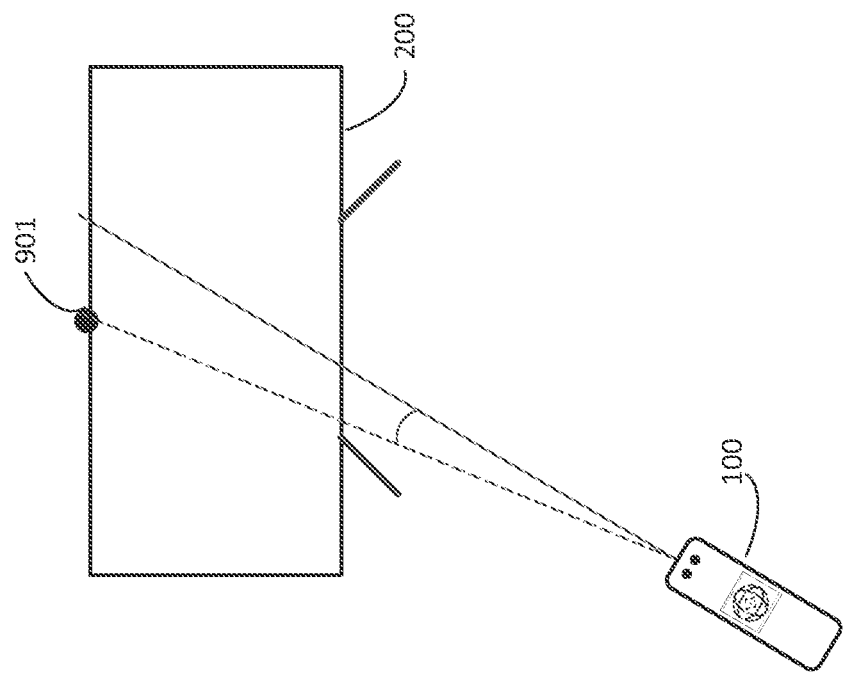
FIG. 9A includes an example of a system comprising a pointing device and a pointing target in the form of a TV screen, including at least one embedded beacon, in accordance with specific embodiments of the invention disclosed herein.

FIG. 9A illustrates an example of a system comprising a pointing device 100 and a pointing target in the form of TV screen 200, including at least one embedded beacon 901. The beacon can be an UWB beacon. The UWB beacon could be for instance a single or dual antenna station. The UWB beacon could be also referred to as a UWB Tag or a UWB Node. A single antenna station could be used to measure a distance information with a time-of-flight detection. A dual antenna station could be used to measure a distance and an angle of arrival (AOA) information.

FIG. 9B illustrates an example of a system comprising a pointing device 100 and a pointing target in the form of TV screen 200, including at least two embedded beacons 902 and 903. The beacons can be an UWB beacon. Each beacon can be distant from the other on a horizontal direction. For instance, each UWB beacon could be positioned on the left and on the right of the TV screen as illustrated in the example of FIG. 9B. According to a specific embodiment, the UWB beacons can be positioned on the top of the TV screen to increase the chances of having a direct line of sight with the telepointer. However, other configurations for positioning the beacons are possible withing the scope of the present disclosure. It is understood that this could be applied to any other form of pointing target and is not limited to a specific TV screen.

In specific embodiments of invention, the angle-of-arrival information while in real-time and frequently refreshed can be subject to jitter noise. In those embodiments, using the angle-of-arrival information to estimate the pointing direction of the portable device could make, for example, a cursor "jump" on the screen. If the AOA, or other information, is used to tack the pointing direction by integrating angular velocity, orientation estimate is subject to a slow drift in time. For a drift of 0.1°/s for instance, after 10 minutes the system may have accumulated an error of around 60°.

In specific embodiments of the invention, by integrating angular velocity, orientation estimate can be subject to a slow drift in time. This drifting error may be acceptable for systems simply relying on "relative" positioning, such as an air wand for a gaming system for instance. By relative positioning it is meant that the cursor must go to the left when the user is orienting the device to the left, and to the right when the user is orienting the device to the right. The drifting error may also be acceptable in an air mouse portable device equipped with a button. For instance, if a user wants to go further into a direction but already have its wrist fully oriented in this specific direction, a button can be pressed (or released) to stall the air-mouse system the time needed to position the user's arm to a more central position and orientation. That way, the user is free again to move its arm the way he wants. This "stalling" system is close to the effect of holding up a traditional roller mouse controller above the desk to replace it at a more central position on the desk. In those cases, there may be no exact mapping between the spatial configuration of the system and the cursor projection on screen, the mapping can be shifted each time the air-mouse system is stalled.

In specific embodiments of the invention, the pointing device may estimate a range of uncertainty and transmit this data along with the estimate of the center coordinates of the pointing direction. This range of uncertainty may therefore by utilized by the system for example to display a different shape of icon (e.g., a circle instead of a dot) or to perform control actions (e.g., selection of virtual objects) based on a virtual envelope determined by the center and range of uncertainty.

A margin of tolerance could be determined based on the transmitted range of uncertainty. The margin of tolerance could be used by the system to perform control actions based on probabilistic rules. For instance, if the pointing device was a remote control or an air mouse configured to select or interact with an object displayed on a screen, a probabilistic approach can be used to determine if and which an object was selected or otherwise operated upon (e.g., drag motion).

In specific embodiments of the invention, the accuracy of the pointing direction determination can be enhanced, and/or ambiguities in the determination of the pointing direction determination can be resolved by using sensor fusion. The sensor fusion can involve fusing information gleaned from antennas on the device and from other sensors.

In specific embodiment of the invention, by comparing the angular velocity measured by the angle-of-arrival system and measuring the angular velocity given, for example by a gyroscope, it can be possible to retrieve the exact pointing direction of the portable device 100.

An angular velocity measurement could be determined using the angles calculated with the geometric calculations described above. An additional angular velocity measurement could be determined using a physical quantity measured by an IMU, a gravity sensor, a magnetometer, or other sensor in the system. In this way, two or more different alternatives could be used within the same system to obtain corresponding measurements from different sources and using different techniques. The different angular velocity measurements can then be used to more precisely determine the pointing direction of the pointing device, by for example fusing the data from the different measurement as will be described below in more detail.

The data from the system and additional sensors can be fused. The fusing can also be used on any data measured by the antennas and any physical data measured by the sensors on the pointing device to get a more accurate prediction of the pointing direction. The fusing can involve an estimate of the uncertainty of the measurements taken by either device. The fusing can also involve any linear quadratic estimation. The fusion can also use a Kalman filter pipeline.

To that end, in specific embodiments of the invention the pointing device 100 may further include an inertial measurement unit (IMU) comprising one or more electronic sensors to measure a specific force, an angular rate of motion (i.e., an angular speed), and/or the absolute orientation of the pointing device, using a combination of accelerometers, gyroscopes, and sometimes magnetometers. A gyroscope may provide angular speed data. A magnetometer may provide an orientation vis a vis a local magnetic field (from the terrestrial magnetic field or/and local magnetic source), although this can be not very accurate for some applications. A set of accelerometers may provide a 3-axis acceleration data. For instance, it can be possible to derive orientation data based on accelerometers, by identifying the gravity (vertical acceleration/force) from the accelerometers data.

The accelerometers can include an electrostatic capacitance (capacitance-coupling) accelerometer that is based on silicon micro-machined MEMS (Micro-Electro-Mechanical Systems) technology, a piezoelectric type accelerometer, a piezo-resistance type accelerometer, or any other suitable accelerometer.

In specific embodiments of the invention, the additional IMU data from the pointing device provides physical variables that can be integrated, along with the AOA data from the portable/fixed system. For instance, the pointing device may integrate the gyroscope angular velocity (one type of IMU data).

A list of IMU sensors and the use of physical variables is described in more details in the U.S. Pat. No. 10,068,463 B2, entitled "Methods for the determination and control of a piece of equipment to be controlled; device, use and system implementing these methods", incorporated herein by reference in its entirety for all purposes.

According to specific embodiments of the invention, the IMU data can be fused with angle-of-arrival data to provide a precise estimate of the height of the pointing device 100 along with an estimate of the position of the pointing device 100 on the horizontal plane. For instance, gyroscope data and the angle-of-arrival data can be combined with other input using Kalman filters as will be described below. This could enable a combination of both the advantage of smooth IMU sensor data (e.g., from a gyroscope) together with angle-of-arrival data (no drift), with Kalman filters as explained in more details below. The system could include a computer readable media storing instructions to allow the system to determine the angular velocity using the geometrical parameters such the angles calculated with the angle-of-arrival techniques. Additionally, the system can be able to collect sensor data from the sensors mentioned herein, such as gravity sensors, magnetometers, and an inertial measurement unit and determine the angular velocity by using that sensor data. Additionally, the system can have instructions stored to perform sensor function and determine a global pointing direction of the pointing device using the angular velocities determined from the different sources in the system.

In specific embodiments of the invention, with the gyroscope, depending on the hypothesis concerning the position and the orientation of the pointing device 100, what would be measured by the angle-of-arrival system can be predicted. If those two information sources are concordant, then the position and orientation hypothesis for the portable device can be deemed right. If not, then another hypothesis for the position and the orientation of the portable device 100 could be considered. The Kalman Filter is one way to address this kind of situation.

Figure 10:
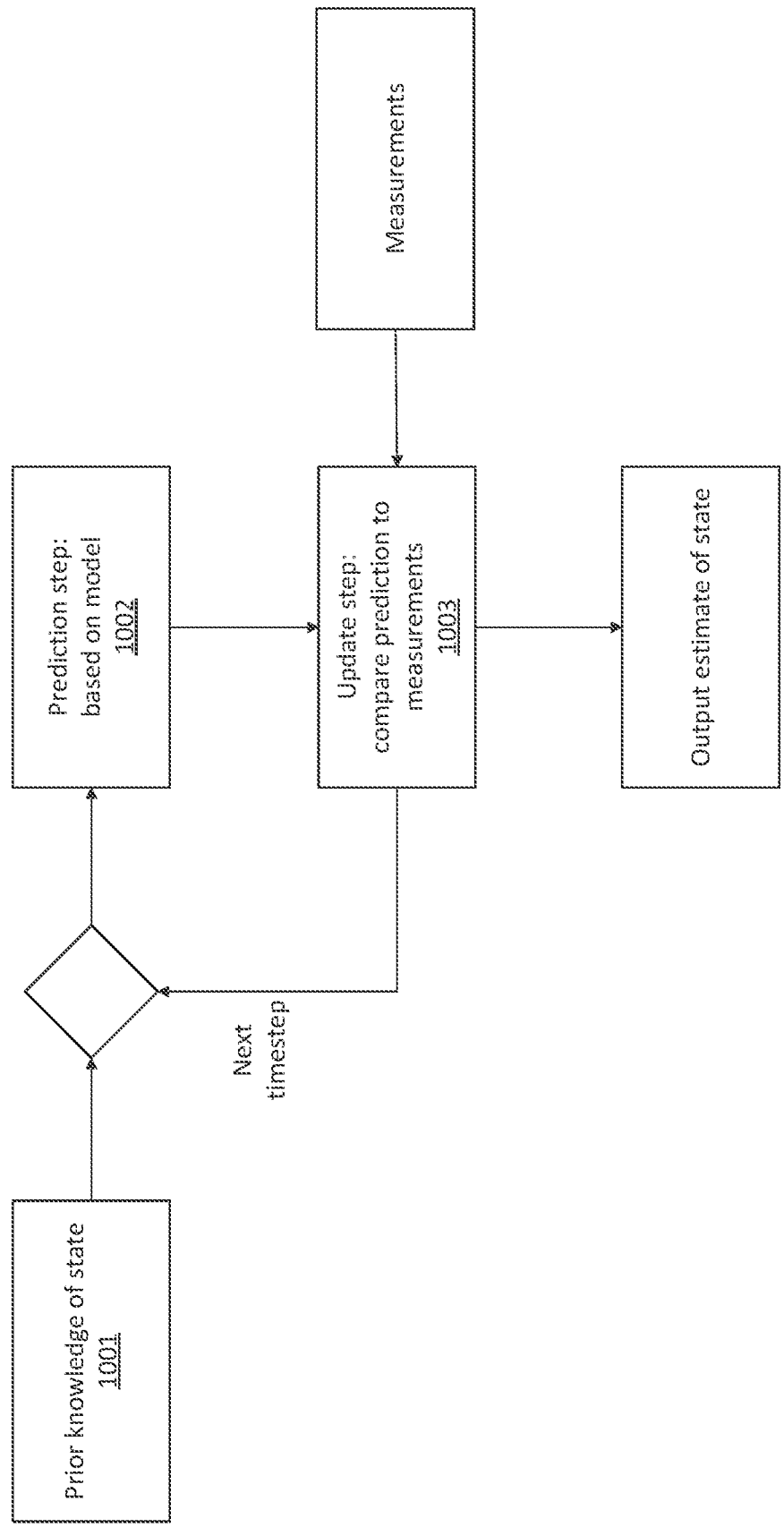
FIG. 10 includes an example of a flow chart for fusing data from a plurality of input sources to estimate the position of the pointing device, in accordance with specific embodiments of the invention disclosed herein.

FIG. 10 illustrates an example of a flow chart for fusing data from a plurality of input sources to estimate the position of the pointing device 100, that can represent the pointing direction of the pointing device on a pointing target such as a fixed screen.

The raw input data from the sensors can be fused to compute an interaction, such as a projected cursor position on a fixed screen. According to specific embodiments of the invention, the raw input data can be fused by a software program, a dedicated hardware or a combination of dedicated hardware and software, implementing a Kalman filter pipeline.

The following paragraphs describe a configuration for fusing the data from a plurality of input sources to estimate the position of a pointing device representing the pointing direction of the pointing device on a target, such as a fixed screen, in accordance with specific embodiments of the present invention.

The Kalman filter pipeline can be used for integrating or fusing a variety of different observations (varying in nature, dimensionality and confidence) to get a semi-optimal estimate of the position and orientation of a mobile object such as the pointing device 100.

The Kalman filter pipeline can include a tradeoff between priori estimate 1001 (propagated in the future by the prediction step 1002), and correction by measurements (implemented by the update step 1003).

According to specific embodiments of the invention, a software can also allow real-time fine tuning of the sensors intrinsic parameters to follow changes in calibration values. It can leverage redundancy in the information provided by the sensors to discard outliers and reinforce the estimate robustness.

A feature of a Kalman filter is that it can keep in memory an up to date estimation but also the uncertainty associated with this estimation, so with each new observation (coming with their own uncertainty parameter), precise adjustment of the tradeoff between prior estimate and new information sources during update can be done. More practically, the Kalman filter can be encoding this uncertainty through a covariance matrix, encoding the variance at each dimension on its diagonal but also the way dimensions are correlated together through its off-diagonal parameters. That way, it can be possible to determine how a change in one dimension could affect others (e.g., how a correction in position should affect the last velocity estimate).

In specific embodiments of the invention, the portable device antennas can be aligned along the longitudinal axis of the pointing device 100. The portable device 100 can be enclosed in a housing/case and so can be also the antennas inside it. In those embodiments, the longitudinal axis of the pointing device could be aligned with the pointing direction of the pointing device, and the antennas could be aligned with the pointing direction of the antennas as was described previously in this disclosure.

In specific embodiments of the invention, the pointing device can be a smart phone device. There are multiple antenna configurations for a smart phone device in accordance with specific embodiments of the invention (which could be used to other types of pointing devices).

According to specific embodiments of the invention, a smart phone can be configured to act as a pointing device by implementing methods implemented by software and/or hardware components. A smart phone can be understood as a hardware consumer electronic device that can be configured with the installation of user applications such as by installing user applications from an "App Store." Alternatively, the functionalities of a smart phone can be enhanced via operating software upgrades performed remotely by the manufacturer. In specific embodiments of the invention, the smart phone application can be configured to use data from a chip, such as an UWB, already installed in the smart phone.

The user application can be used, for example, to control a TV by pointing the smart phone to the TV and displaying on the screen of the TV a cursor in the direction pointed by the phone. Alternatively, instead of displaying a cursor, a component (e.g., HTML5 component) could be activated on the TV screen based on the pointing direction of the smart phone.

In specific embodiments of the invention, ergonomic and physiological considerations can be considered in order to provide a comfortable viewing experience. Ergonomic and physiological considerations can include possible eye strain, size of the room, size of the screen, viewing distance, resolution, etc. For example, in the examples where the system includes a screen, the system can be configured for an optimized signal-to-noise ratio (SNR) for a viewing distance comprised between 1.5 and 2.5 of the diagonal length of the screen. For instance, for a 55 inches (1.4 meters) screen diagonal, a viewing distance of 2.8 meters would be two times the diagonal, which is in the middle of the 1.5 to 2.5 range.

In specific embodiments of the invention, ambiguities with respect to the initial position of the elements of the system can be resolved in various ways. For example, the initial position can be unknown to the system. The position of the pointing device with respect to the pointing target can be an important information to consider. For example, projection of a cursor on a screen could depend on the pointing device position in space, not only on the pointing device orientation.

Figure 11:
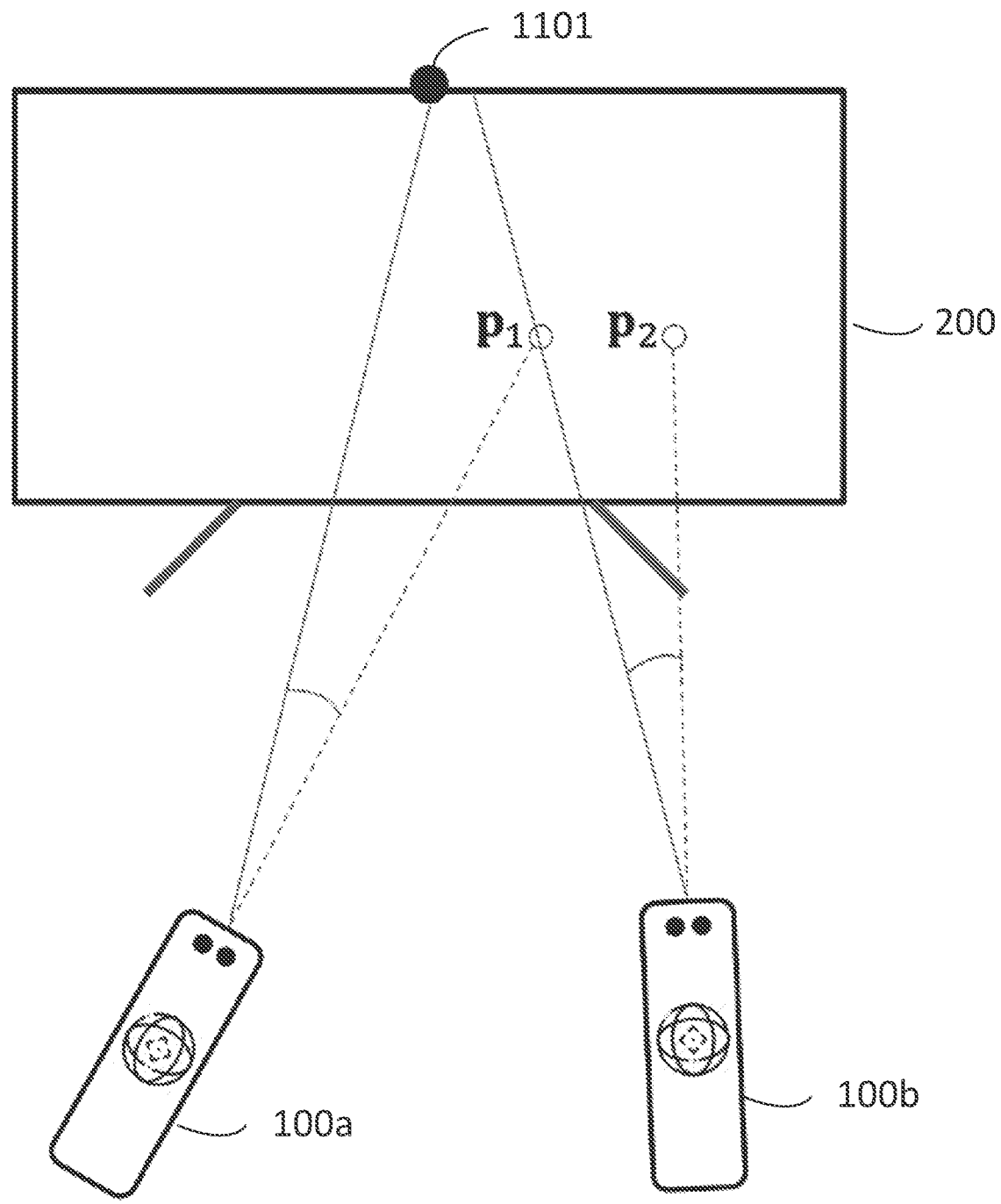
FIG. 11 includes example of two pointing devices that can measure the same AOA and distance to a tag on the pointing target, but having different positions, in accordance with specific embodiments of the invention disclosed herein.

With an initial AOA estimate from a UWB sensing system, there could be an ambiguity about the position of the pointing device in space. FIG. 11 illustrates an example of two pointing devices 100a and 100b (remotes in this illustration) that can measure the same AOA and distance to a tag 1101 on the pointing target 200 but having different positions. This can be an issue because those two different positions could translate to two different projection points on the screen p1 and p2. Therefore, it could be important to consider the remote position to have a proper sense of what the remote is pointing at on the screen.

One possibility could be the setting of an arbitrary initial position. In this way, a predefined initial position can be assumed for the pointing device, irrespective of the actual position the user. For example, an initial position of the user could be assumed to be on the x axis. This (erroneous) assumption could be acceptable in an environment where the pointing target is a TV, and the user normally watches TV with the same placement.

Figure 12:
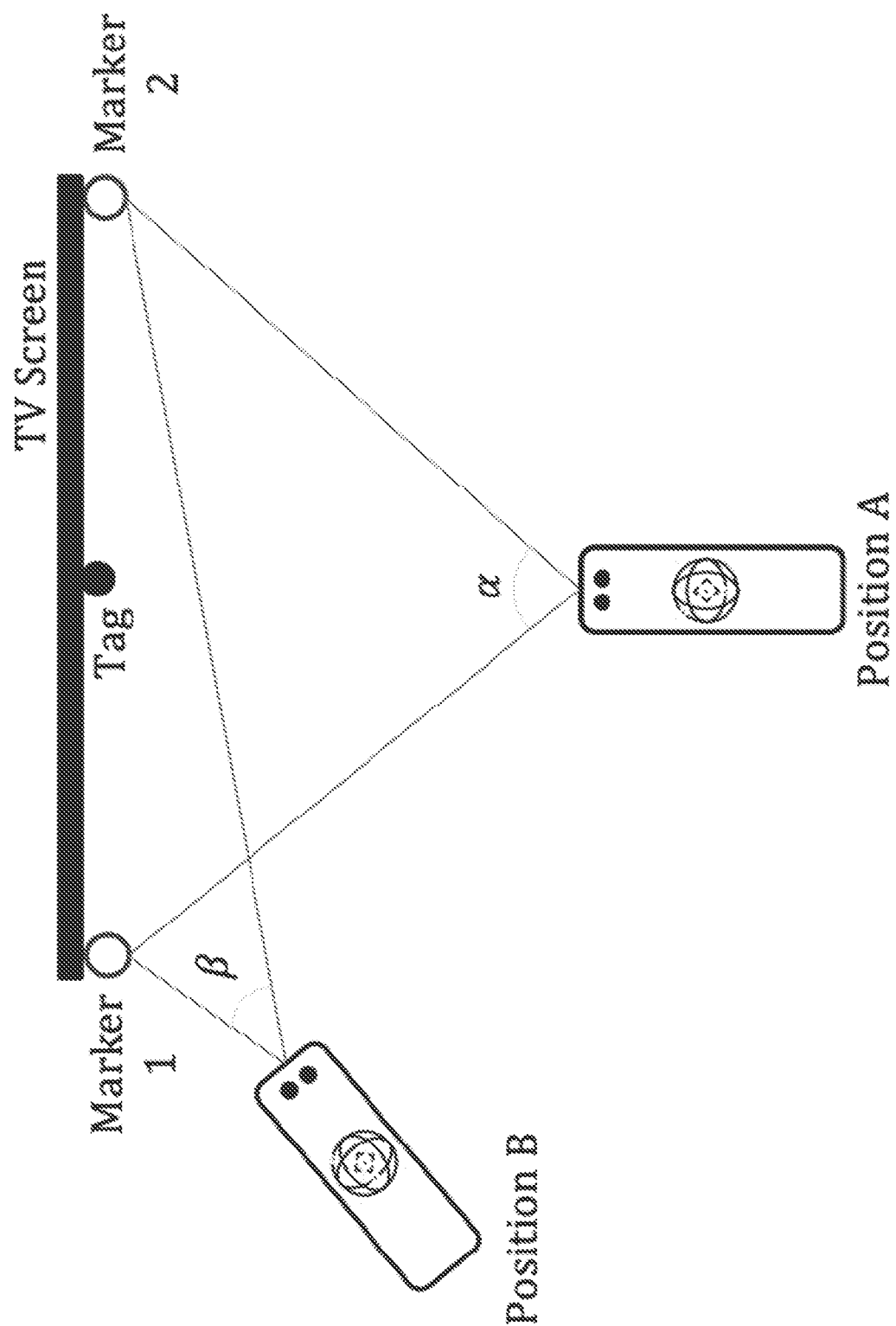
FIG. 12 includes an example of a single pointing device placed in different positions with respect to the pointing target, in accordance with specific embodiments of the invention disclosed herein.

Another possibility could be determining an initial position with a two-shot pointing, as illustrated in FIG. 12. For example, a prompt can be presented to the user to initiate a calibration procedure. The prompt could ask the user to point at two different places on the pointing target with the pointing device. In the example of FIG. 12, the prompt could be presented to the user, asking to sequentially point in the direction of two different markers (Marker 1 and Marker 2 respectively) at each lateral extremity of the screen, or other position on the screen.

An angle difference (α or β) between the lines representing the pointing directions when pointing at the two markers depends on the position of the pointing device 100. For a fixed distance between the screen 200 and the pointing device 100, the more the pointing device is off the center of the screen, the less the angle difference is between pointing at the two markers. In this illustration, α is indeed bigger than β.

For a pointing device located on the plane defined by the screen surface, this angle could even reduce to zero. This procedure could work without the need of an UWB sensor system as the ones described herewith. An IMU angular estimation could be enough, especially at such short time laps where orientation drift could be unnoticeable.

However, this calibration procedure has some limitations. First, it can allow an estimation of the laterality of the remote but only up to a left-right ambiguity. This left-right ambiguity can be resolved by asking the user at which side the user is located, or by constraining the user to point at the marker he is closer to (or farther) first. But this could impact the user experience. Second, the accuracy of the calibration procedure could be affected by the accuracy of the orientation estimation. Results given by the IMU may be very accurate, but these could also be accumulating errors in pointing made by the user. User experimentations made by the applicant showed a large difference between the point a user think he/she is pointing at and the point the user is actually pointing at. At larger distances where the screen size viewed from the user perspective is small, those errors can greatly affect the positioning estimation. Lastly, the calibration procedure could be affected by difference in the user's hand position between the two pointing operations.

In specific embodiments of the invention, finding the position can be achieved by leveraging on IMU orientation estimation. In this way, an alternative calibration procedure can be performed. A prompt can be presented to the user to initiate the calibration procedure, asking the user to point in the direction of the screen from a known angle of incidence relative to the screen surface. As in the previous examples, a screen is being used as a non-limiting example of a pointing target.

FIG. 12 shows two equivalent solutions for a given remote distance and angle of arrival, but in fact an infinite set of possible positions can exist. Those solutions all lie at the surface of a sphere (or at the contour of a circle if we are restricting the height). That being said, it could be possible to have two pointing devices at different positions measuring the same angle of arrival and distance to a tag or reference point on the screen, but in this case they would not have the same absolute orientation. Moreover, given two pointing devices measuring the same angle of arrival and given their orientation in a given frame and distance to the tag, it could be possible to retrieve their positions.

In accordance with the alternative calibration procedure described with reference to specific embodiments of the present invention, an IMU can be used to provide a sense of the orientation of the pointing devices. Two issues could remain to retrieve the position. First, the IMU could only provide the orientation in an arbitrary frame that doesn't necessarily match the frame where the position and orientation of the screen is known (i.e., the TV frame defined in FIG. 12 above). This issue can be partly solved by the fact that an accelerometer allows to retrieve the horizontal plane. Second, a remaining ambiguity could occur up to a rotation of the remote on its z (rb) axis. To find this rotation, an alignment phase could be necessary. It could be possible to ask the user to point in the direction of a screen tag from a known position, to deduce that the pointing direction of the pointing device projected to the horizontal plane should be aligned with the pointing device to screen axis, allowing to compute the missing alignment rotation. The procedure described above could also be used to get an initialization position and match the pointing device-screen direction with the IMU direction.

In specific embodiments of the invention, the ambiguity in position on the horizontal plane can be resolved by adding additional modules, such as UWB modules, on the pointing target side. For example, it could be possible to add a new UWB tag at a different place on the screen and use multi-lateration algorithms to find the pointing device location. Another possibility could be to replace a UWB Tag by a UWB Node, providing with horizontal inter-antenna axis.

Figure 13:
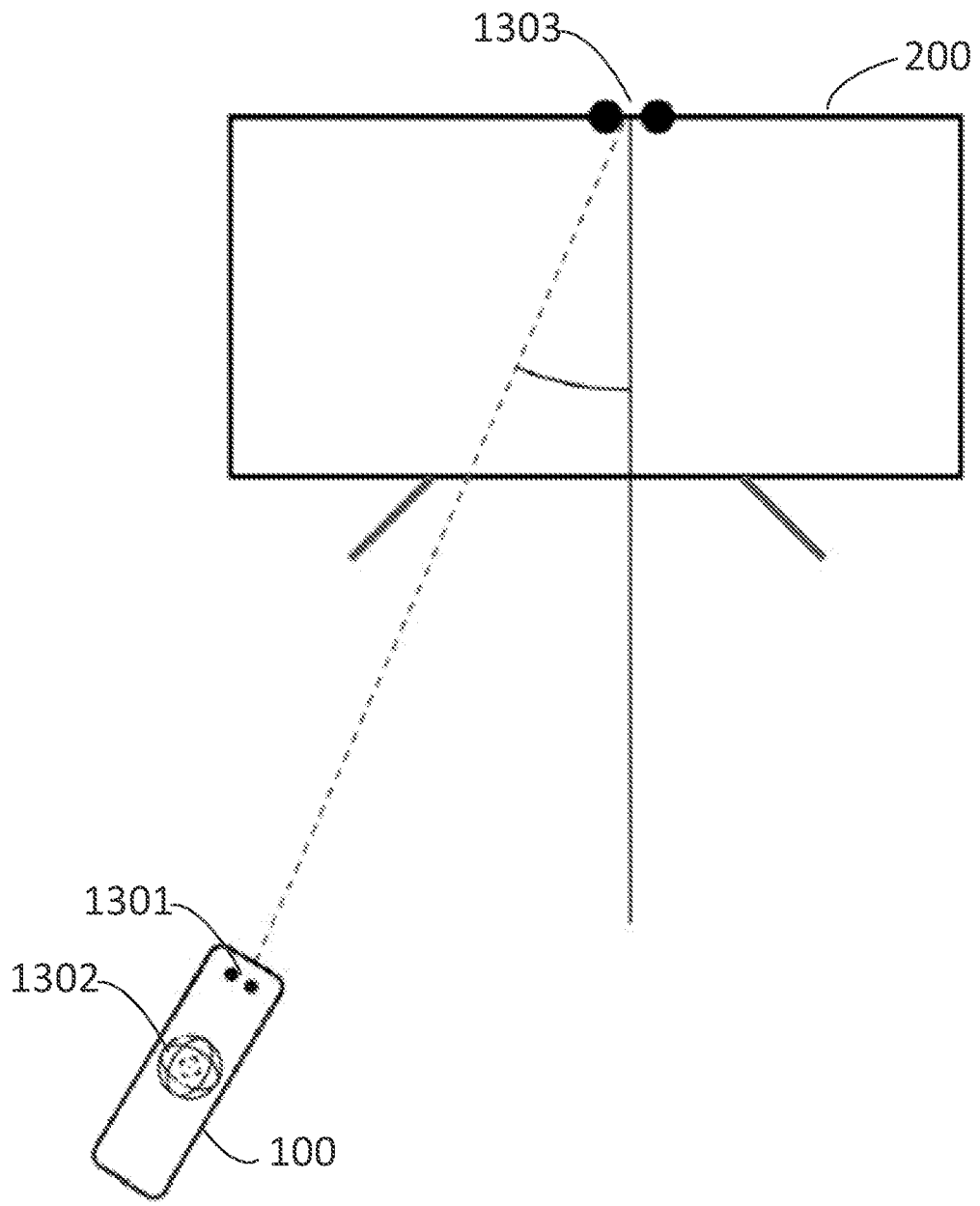
FIG. 13 includes a system with a dual antenna station on both the pointing device and the pointing target.

As illustrated in FIG. 13, nodes, such as UWB nodes, can be present at both sides of the UWB sensor system, for example to compute the pointing device position on the horizontal plane. FIG. 13 illustrates a pointing device 100 comprising a dual antenna station 1301 and IMU 1302, and a screen 200 also comprising a dual antenna station 1303.

In specific embodiments of the invention, information about the height of the pointing device may be required. It can be difficult to estimate the height of the pointing device with respect to the pointing target. The altitude can be understood as the vertical position of the pointing device with respect to the pointing target, such as a TV screen, or conversely, the vertical position of the TV screen in the referential system of the pointing target (e.g., elevation of the TV in the pointing device body frame).

With reference back to the polar coordinates in FIG. 8B:
x: pointing direction of the pointing device body ("rb")
(x, y): horizontal plane of "rb"
φ: azimuth of "rb"
θ: elevation of "rb"

The elevation (θ), which can be understood as the angular component of the altitude information, can be missing. In specific embodiments of the invention, it may be reasonable to assume that the pointing device roll is minimal as most of the pointing operations may be done by using translation, pitch rotation, and yaw rotation of the pointing device. However, in this configuration (without any roll) the AOA system could essentially describe only the azimuthal part of the angle of arrival and not the elevation.

For instance, the pointing device could be held flat on the horizontal plane and pointing to a tag (on single or dual antenna station of the screen). In this configuration, the two node antennas could receive the signal exactly at the same time, with no difference in phase. By moving the pointing device on the y axis or changing its yaw, one node antenna could start to move closer to the tag than the other, inducing a phase difference and thus the discrimination at different azimuth with respect to the pointing device. However, by varying pitch or moving the pointing device on the z axis instead, both node antennas could always stay at an equal distance to the tag, with constant phase difference. In this context the AOA system could not give any clue on what would be the elevation of the pointing target with respect to the pointing device reference frame. This ambiguity could result in an error in the height of the pointing device in space and, for example, the height of the projected cursor on screen.

The height of the pointing device can be estimated. We can alternatively fix the height of the cursor on screen (e.g., possessing ex ante knowledge of the height of a target on the screen and asking the user to align the cursor with the target), then the IMU orientation would allow us to compute the height of the remote, or fix the height of the remote (e.g., asking the user to position the remote at a specific height), then the IMU orientation would allow us to compute the height of the projected cursor on screen. But we cannot compute both at the same time: the system is underdetermined. From those options, it could be reasonable to fix the height of the remote in space. With a good hypothesis concerning the behavior of the user (e.g., sitting or standing up), the average height error may be acceptable.

In specific embodiments of the invention, data from a sensor can be added for height measurement or estimation. For example, accelerometer data can be used to derive the elevation θ. As another example, one or more pressure sensors can be used to measure the pointing device altitude. These sensors could introduce other error factors to correct linked to the temperature and time.

A calibration procedure according to specific embodiments of the invention could use the 90° roll. A prompt can be presented to the user to initiate a calibration procedure, asking the user to hold the remote with 90° roll. This could be achieved by twisting the hand holding the remote, which is a simple enough gesture to operate. In such circumstances, the two node antennas could be perfectly aligned to measure the elevation of the TV with respect to the remote and thus its height.

In accordance with the above, a first set of geometric parameters, such as an angle of arrival, could be calculated at a first position using a first signal, and a second set of geometric parameters could be calculated at a second position using a second signal. The difference between the first and second positions could be given by the roll. For example, a sensor could indicate when the 90 roll has been completed to gate when a second signal is received so that the new parameters can be determined.

In specific embodiments of the invention, a Kalman filter can be used for the calibration procedure and height estimation. A height estimation can be performed using Kalman filters and integrated in the fusion algorithm, allowing opportunistic height estimation as soon as the remote is experiencing even small rolls. The Kalman filters used for the data fusion could also allow the system to modulate its speed of convergence depending on the amount of roll: convergence to the optimal height could be faster at large rolls than small ones. In other words, an "implicit" or "opportunistic" calibration can be performed by monitoring changes to the orientation of the pointing device. When the pointing device is rotated along its pointing direction (x), then additional data can be available even if the rotation isn't a full 90° rotation. This additional data can be processed by Kalman filters for instance, to derive an estimate of the elevation (hence the elevation).

In specific embodiments of the invention, the pointing device could comprise an additional antenna, such as an UWB antenna, arranged so that the three antennas of the pointing device form approximately a right angle. This can provide a way to resolve the ambiguity for the elevation θ without the need for a gesture-based calibration. Hence, such a system could resolve the ambiguity, but at the expense of an additional hardware component (the third antenna).

In specific embodiments of the invention another antenna (s), such as UWB antennas, is/are added on or near the pointing target. The new antenna could be at a different height than the other(s). This could allow direct computation of the pointing device height or of the pointing target elevation with respect to the pointing device body frame. The new antenna could be added in the form of a beacon, such as an UWB beacon, with a single antenna on the pointing target at different height, or by changing one of the single antenna stations by a dual antenna station with vertical inter-antenna axis.

Figure 14:
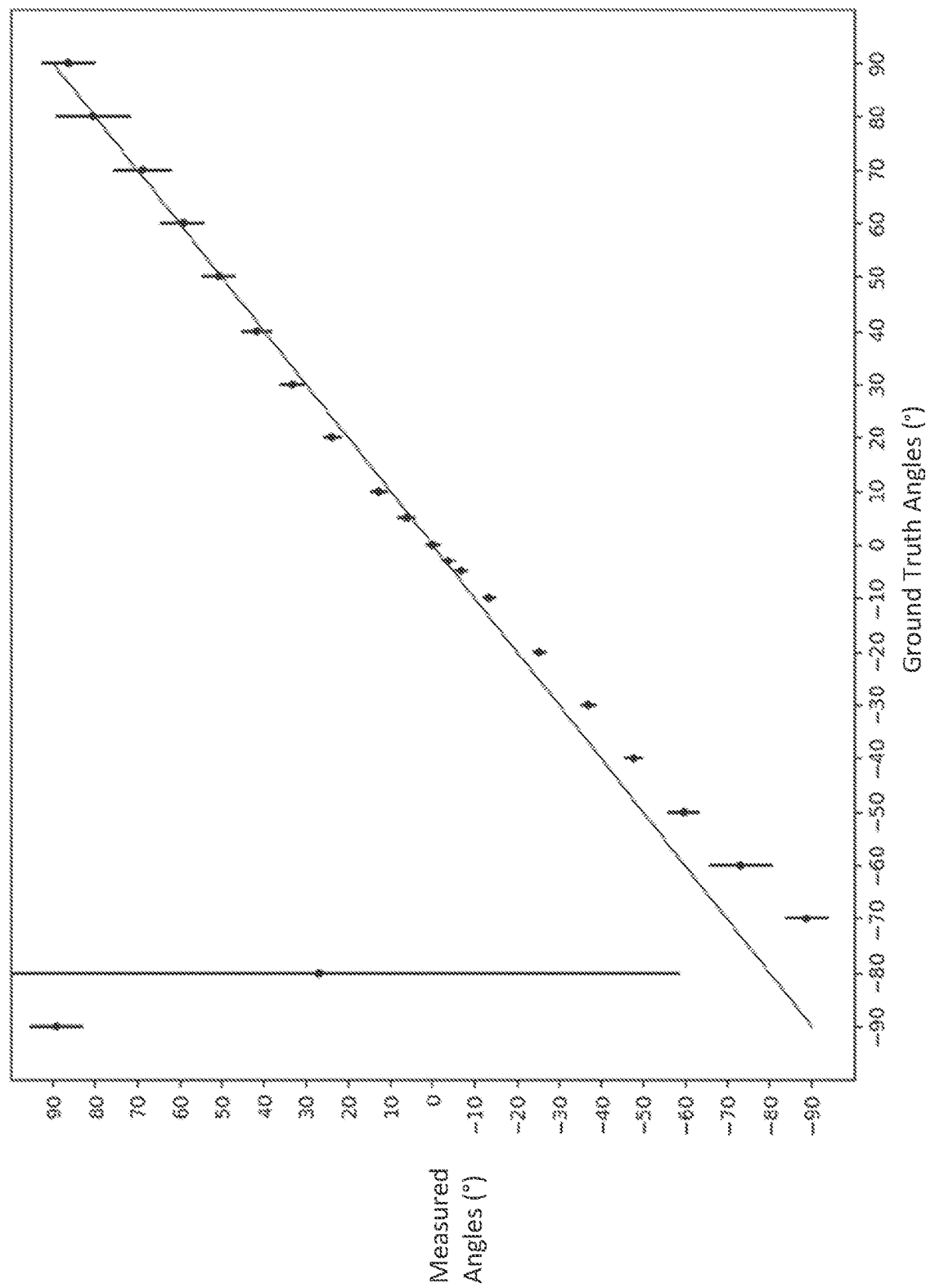
FIG. 14 includes a representation of a measured AOA with a sensor system at 3 meters, in accordance with specific embodiments of the invention disclosed herein.
Figure 15:
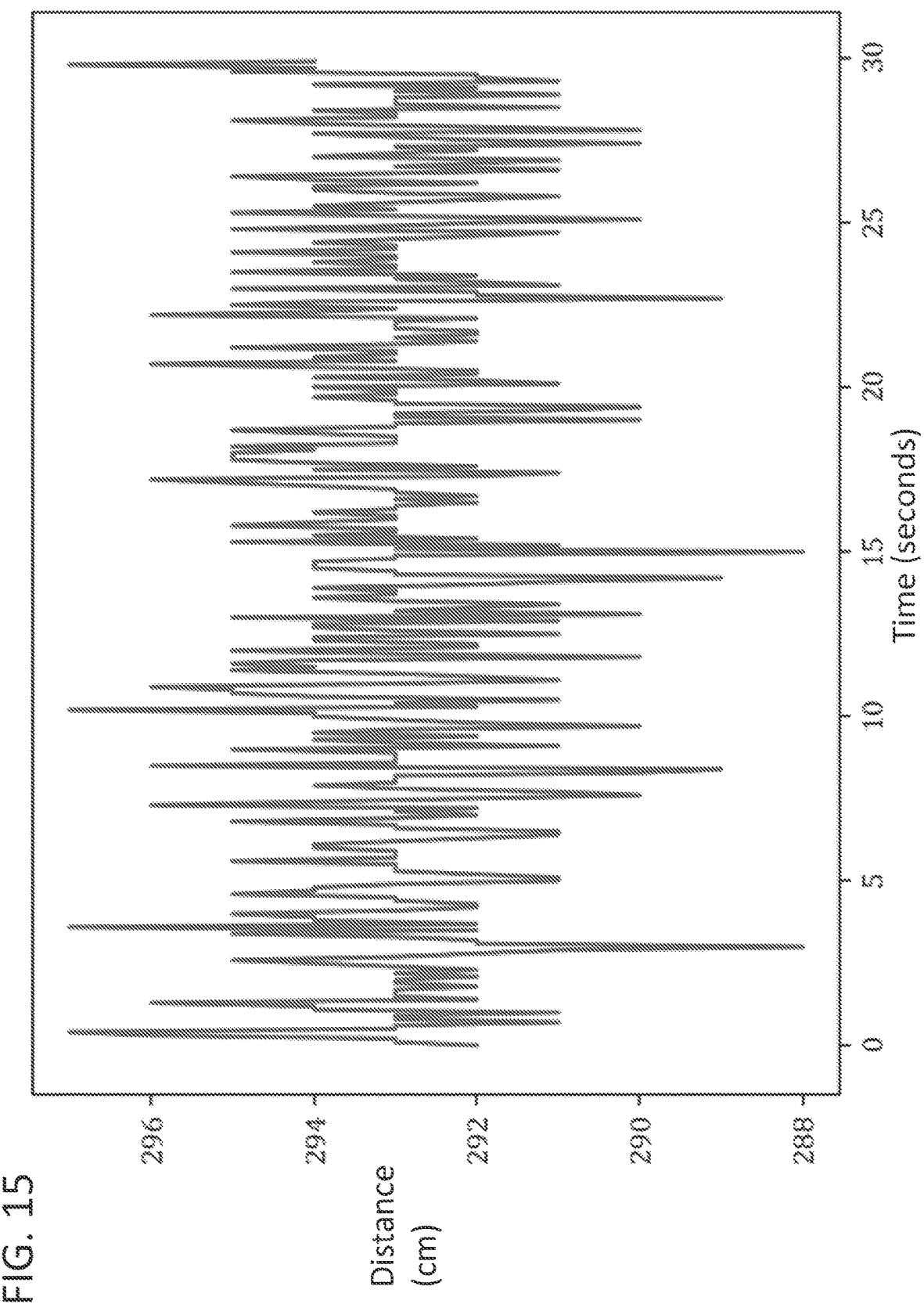
FIG. 15 illustrates distance measurements at 3 meters for 30 seconds, with AOA of 0 and a remote pitch of 0, in accordance with specific embodiments of the invention disclosed herein.

FIG. 14 and FIG. 15 can be used to describe a performance prediction model to go from raw error quantification from sensors, such as UWB sensors, to a functional error analysis. This model could allow the prediction of the behavior of a pointing device using raw measurements, such as raw UWB measurements.

FIG. 14 illustrates results of the measurements for an AOA angle estimation. At each angle, measured standard deviation are represented by the vertical bars. There are anomalies presents at −80° and −90°. Indeed, for important angles the system could suffer from an ambiguity in recognizing which antenna receives the signal first. The resulting angle can then be alternating between two extremes values when this phenomenon starts to occur. At −80°, this instability could explain why the average measured angles sit between −80° and 80° with very large standard deviation. At −90° there is no instability anymore, but the system totally wrapped the angle of arrival and its sign has now changed.

These two abnormal values can be excluded for performance analysis purposes. In addition, as show in FIG. 13, multiple phenomena can impact the results of the angle measurements. The standard deviation increases the farther we are from 0°. In other words, precision can degrade the more the pointing target is pointing away from the center position.

The table below summarizes the results of measured AOA at 3 meters. As shown the table, the standard deviation is varying from 1.94° when the angle of arrival (AOA) is 0° up to roughly 9° when the angle of arrival is 80°.

| Ground Truth Angle (degrees) | Averaged Measured Angle (degrees) | Standard deviation (degrees) |
|---|---|---|
| −90 | 89.46 | 6.20 |
| −80 | 27.17 | 85.79 |
| −60 | −73.08 | 7.56 |
| −70 | −88.61 | 4.99 |
| −50 | −59.54 | 3.83 |
| −40 | −47.58 | 2.29 |
| −30 | −36.65 | 1.78 |
| −20 | −25.15 | 1.57 |
| −10 | −13.23 | 1.55 |
| −5 | −6.57 | 1.78 |
| 0 | −0.00 | 1.94 |
| 5 | 6.31 | 2.03 |
| 10 | 12.88 | 2.02 |
| 20 | 23.88 | 2.29 |
| 30 | 33.41 | 2.99 |
| 40 | 41.86 | 3.69 |
| 50 | 50.81 | 4.16 |
| 60 | 59.46 | 5.29 |
| 70 | 69.11 | 6.97 |
| 80 | 80.72 | 8.98 |
| 90 | 86.52 | 6.51 |

Accuracy results can be mixed with overall better results at the center and at positive angles, but an important negative bias at negative angles with up to −18.61° bias at −70°, where it is lesser than 1° at positive 70°.

FIG. 15 illustrates distance measurements made by an UWB sensor system with 3 meters distance between a tag, for example in a pointing target, and a node, for example in a pointing device, during 30 seconds at 10 Hz frequency sampling. The measurements considered an AOA of 0° and remote pitch of 0°.

The peak variation around the mean is roughly equal to 5 cm. The standard deviation $\sigma \cong 1.91$ cm, which means that if $3\sigma$ is considered as a measure of maximum deviation a resulting maximum deviation would be $3\sigma = 5.73$ cm.

In specific embodiments of the invention, the measurements errors can be translated into an estimate of the accuracy and precision of a system, such as an air mouse system, using a functional performance prediction model (i.e., a simulation).

For the sake of this analysis, the user can be aligned with the TV x axis and the variable can be the distance to a screen. In other words, the results of the simulation shows the variation of performances with the pointing direction of the telepointer:

If the user is pointing straight toward the TV tag, varying the distance between the user and the screen could not change anything.

The error could only exist when the remote is not pointing straight to the TV tag and could be amplified with increased deviation from this direction. The greatest divergence that could be expected is the user pointing at one bottom corner of the screen (approximately 92 cm distant to the tag)

$$\Delta d \left( \frac{0.92}{|p_r|} \right) = \pm 0.05$$

With a viewing distance (distance between user and screen) of 2.8 m (i.e., $|p_r|=2.8$ m) on the x axis of the screen, the result is:

$$\Delta d \cong \pm 0.15$$

The applicant noticed that the error on range measurements provided by an UWB sensor system doesn't have too much functional effect, standard deviation being most of the time below 15 cm.

A system in accordance with the embodiments described herein could be used in various applications. For example, the system can be used for controlling a television, a smart television or a home theater system. The pointing device can be configured as a virtual pointer, wherein the location of the pointing direction can be communicated for display on a screen of the television, smart television or home theater system. The pointing device can be configured as a remote controller, wherein the output data of the pointing device is converted in control inputs of the user interface for the television, smart television or home theater system. The control inputs can be transmitted via existing physical communication interfaces (e.g., infrared signals, wireless signals) or via an Application Programming Interface (API).

The system can be used for controlling existing media systems having a variety of different input mechanisms. For example, some media systems may be controlled by a user providing inputs directly on an interface of the media system (e.g., by pressing buttons incorporated on the media system, or by touching a touchscreen of the media system). Data from the pointing device could be provided to an API of an existing media system or to a connected pointing analysis module receiving the pointing device data.

The system can be used for controlling electronic components in a ubiquitous computing environment. A pointing device can be used to control electronic components using multimodal integration in which inputs from a speech recognition subsystem, gesture recognition subsystem employing the data provided by the pointing device and/or a pointing analysis system receiving the pointing device data, are combined to determine what electronic component a user wants to control and what control action is desired.

The system can be used for controlling a video game or an entertainment system. For instance, the system could be used with a home video game system including a pointing device according to the invention and leveraging the pointing device as a wireless handheld game control device with capabilities including position sensing. The pointing device could operate as a controller device in which a housing is held by one hand and, in that state, operating keys and operating switches arranged on an upper surface and lower surface of the pointing device housing are operated.

The system can be used for moving and controlling a cursor, object, character, or mechanical system in a virtual or physical 3D environment. For instance, the system can be configured to transmit the pointing device coordinates in absolute or relative spherical coordinates or cartesian coordinates to a computing system. According to a specific embodiment, the direction of the pointing device can be used to compute 2D coordinates in an intersecting surface defined by a physical or a virtual surface or screen.

For example, an objective of specific embodiments of the invention is to interact with a remote screen or surface with a telepointer, for instance by displaying a cursor on the screen at the intersection between the pointing direction and the surface of the screen. Other forms of interactions are possible, such as unlocking and controlling a remote computing device connected to a monitor or video projector, remotely controlling a smart television, remotely controlling a set-top box connected to a TV screen, displaying a contextual smart remote user interface based on the identification of the pointed object (real or virtual), determining a piece of equipment to be controlled based on the pointing direction of the telepointer, controlling an audio or video playback based on the pose or/and orientation of the telepointer.

For example, the system can be used for controlling a television, a smart television, or a home theater system and more generally a controllable device. The pointing device can be configured as a virtual pointer, wherein the location at which the pointing direction intersects a pointing target surface is communicated for display on a screen of the television, smart television, or home theater system. The pointing device can be configured as a remote controller, wherein the output data of the portable device is converted in control inputs of the user interface in the television, smart television, or home theater system. The control inputs can be transmitted via existing physical communication interfaces (e.g., infrared signals, wireless signals). The control inputs can be configured to interact via an Application Programming Interface (API) of the controllable device.

In specific embodiments of the invention, the pointing device can be a control device and the pointing target can be a controllable object. The pointing device can be a remote control for selecting pointing targets in the form of controllable objects, or communication objects generally. Pointing the pointing device at a specific pointing target could form an association between the controllable or communication object and a routing system. The association could then be used to route commands to the currently associated controllable objects or communications from the currently associated communication object. For example, if the object were a controllable object such as a television, commands obtained from a user on the pointing device could be routed to the controllable object while the association was maintained. As another example, if the object were a communication object such as a weather service on a remote server, communications obtained from the remote server could be routed to the pointing device while the association was maintained. In this manner, a user could receive communications from and send command to various objects based on where the pointing device was pointing at any given time.

The object association formed by pointing the pointing device at a given target could also be used to alter a user interface by presenting controls on that interface for the currently associated object. The user interface could be provided on the pointing device. For example, the pointing device could include a touch display, and controls for the currently associated controllable object could be presented on the touch display when the association was formed. When the user pointed the pointing device at a television, the touch display could show a channel and volume control interface for the television. When the user turned the device to point at a light, the touch display could show a brightness control interface for the light.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, although the example of a pointing device comprising two antennas aligned with the pointing axis was used throughout the disclosure, more than two antennas can be aligned with the pointing direction and participate of the angle-of-arrival measurements. Although many examples were given of an UWB system and components, the concepts disclosed herein are equally applied to other radio technologies. These and other modifications and variations to the present invention may be practiced by those skilled in the art, without departing from the scope of the present invention, which is more particularly set forth in the appended claims.

What is claimed is:

1. A device providing a calibrated pointing direction comprising:
    a set of antennas including a first antenna and a second antenna, wherein the first antenna and the second antenna are aligned with the pointing direction in a line and wherein the line connects a center of the first antenna to a center of the second antenna and is parallel with a pointing direction;
    at least one of an inertial measurement unit, a gravity sensor, and a magnetometer; and
    one or more computer readable media storing instructions which, when executed on the device, cause the device to:
        receive a signal at the first antenna and the second antenna;
        determine a difference between: (i) the signal as received by the first antenna; and (ii) the signal as received by the second antenna;
        determine, using the difference, an angle between: (i) the pointing direction; and (ii) a signal source direction of the signal wherein the angle is a first estimation of the pointing direction based on the angle;
        measure a physical quantity using the at least one of the inertial measurement unit, the gravity sensor, and the magnetometer, wherein the physical quantity is a second estimation of the pointing direction based on the physical quantity; and
        determine the calibrated pointing direction of the device by fusing the first estimation and the second estimation using sensor fusion that is performed by using a Kalman filter pipeline, wherein the fusing of the first estimation and the second estimation using the sensor fusion that is performed by using the Kalman filter pipeline further comprises:
            implementing a prediction performance model to quantify an error in the angle of the first estimation; and
            reduce the error in the angle of the first estimation by performing a functional error analysis using the second estimation.

2. The device of claim 1, wherein:
    the one or more computer readable media further store instructions which, when executed on the device, cause the device to:
        determine a first angular velocity measurement using the angle;
        determine a second angular velocity measurement using the physical quantity; and
        wherein the determining of the calibrated pointing direction uses the first angular velocity measurement and the second angular velocity measurement.

3. The device of claim 1, wherein the determining of the calibrated pointing direction further comprises:
    determining an absolute position of the device; and wherein the physical quantity is used to determine the absolute position.

4. The device of claim 1, wherein the determining of the calibrated pointing direction further comprises:
determining an absolute position of the device;
wherein the physical quantity is used to determine a height of the device; and
wherein the angle and the height of the device are used to determine the absolute position of the device.

5. The device of claim 1, wherein the one or more computer readable media further store instructions which, when executed on the device, cause the device to:
after a change in the physical quantity having a predefined magnitude, receive a second signal at the first antenna and the second antenna;
determine a second difference between: (i) the second signal as received by the first antenna; and (ii) the second signal as received by the second antenna;
determine, using the second difference, a second angle between: (i) the pointing direction; and (ii) the signal source direction of the signal wherein the second angle is a third estimation of the pointing direction; and
wherein the determining of the calibrated pointing direction of the device further fuses the angle and the second angle.

6. The device of claim 1, wherein:
antennas in the set of antennas are ultra-wide band antennas.

7. The device of claim 1, wherein:
the pointing direction is physically delineated by the device.

8. The device of claim 1, wherein:
the device is one of: an air mouse, a smart phone, a smart remote, and a telepointer.

9. The device of claim 1, wherein:
the angle is a pointing angle; and
the one or more computer readable media further store instructions which, when executed on the device, cause the device to:
identify a pointing target based on the calibrated pointing direction.

10. A system comprising:
a portable device providing a calibrated pointing direction and including a set of antennas including a first antenna and a second antenna, and at least one of an inertial measurement unit, a gravity sensor, and a magnetometer, wherein the first antenna and the second antenna are aligned with a pointing direction in a line and wherein the line connects a center of the first antenna to a center of the second antenna and is parallel with the pointing direction;
a third antenna associated with a pointing target; and
one or more computer readable media storing instructions which, when executed by the system, cause the system to:
transmit a signal using the third antenna;
receive the signal at the first antenna and the second antenna; determine a difference between: (i) the signal as received by the first antenna; and (ii) the signal as received by the second antenna;
determine, using the difference, an angle between: (i) the pointing direction; and (ii) a signal source direction of the signal wherein the angle is a first estimation of the pointing direction based on the angle;
measure a physical quantity using the at least one of the inertial measurement unit, the gravity sensor, and the magnetometer wherein the physical quantity is a second estimation of the pointing direction based on the physical quantity; and
determine the calibrated pointing direction of the portable device by fusing the first estimation and the second estimation using sensor fusion that is performed by using a Kalman filter pipeline, wherein the fusing of the first estimation and the second estimation using the sensor fusion that is performed by using the Kalman filter pipeline further comprises:
implementing a prediction performance model to quantify an error in the angle of the first estimation; and
reduce the error in the angle of the first estimation by performing a functional error analysis using the second estimation.

11. The system of claim 10, further comprising:
an array of antennas which includes the third antenna;
wherein the one or more computer readable media further store instructions which, when executed by the system, cause the system to:
transmit a set of signals using the array of antennas;
determine a set of differences between: signals in the set of signals as received by the first antenna; and (ii) the signals in the set of signals as received by the second antenna; and
wherein the determining of the calibrated pointing direction includes determining, using the set of differences, a pose, and a location of the portable device.

12. The system of claim 10, wherein:
the one or more computer readable media further store instructions which, when executed by the system, cause the system to:
determine a first angular velocity measurement using the angle;
determine a second angular velocity measurement using the physical quantity; and
wherein the determining of the calibrated pointing direction using the sensor fusion uses the first angular velocity measurement and the second angular velocity measurement.

13. The system of claim 10, wherein the determining of the calibrated pointing direction further comprises:
determining an absolute position of the portable device; and
wherein the physical quantity is used to determine the absolute position.

14. The system of claim 10, wherein the determining of the calibrated pointing direction further comprises:
determining an absolute position of the portable device;
wherein the physical quantity is used to determine a height of the portable device; and
wherein the angle and the height of the portable device are used to determine the absolute position of the portable device.

15. The system of claim 10, wherein the one or more computer readable media further store instructions which, when executed on the portable device, cause the portable device to:
after a change in the physical quantity having a predefined magnitude, receive a second signal at the first antenna and the second antenna;
determine a second difference between: (i) the second signal as received by the first antenna; and (ii) the second signal as received by the second antenna;

determine, using the second difference, a second angle between: (i) the pointing direction; and (ii) the signal source direction of the signal wherein the second angle is a third estimation of the pointing direction; and wherein the determining of the calibrated pointing direction of the portable device further fuses the angle and the second angle, wherein fusing the angle and the second angle is performed by using the Kalman filter pipeline and wherein the fusing of the first estimation and the second estimation using the sensor fusion that is performed by using the Kalman filter pipeline further comprises:

implementing the prediction performance model to quantify the error in the angle; and reduce the error in the angle of the first estimation by performing the functional error analysis using the second angle.

16. The system of claim 10, wherein:
antennas in the set of antennas are ultra-wide band antennas.

17. The system of claim 10, wherein:
the pointing direction is physically delineated by the portable device.

18. The system of claim 10, wherein:
the portable device is one of: an air mouse, a smart phone, a smart remote, and a telepointer.

19. The system of claim 10, wherein:
the angle is a pointing angle; and
the one or more computer readable media further store instructions which, when executed by the system, cause the system to:
identify a location on the pointing target based on the pointing angle.

20. A method, in which each step is computer-implemented, comprising:
obtaining a first sample of a signal on a first antenna and a second sample of the signal on a second antenna, wherein the first antenna and the second antenna are in a set of antennas on a portable device, wherein the portable device provides a calibrated pointing direction, and wherein the first antenna and the second antenna are aligned with the pointing direction in a line and wherein the line connects a center of the first antenna to a center of the second antenna and is parallel with a pointing direction;

determining a difference using the first sample and the second sample;

determining, using the difference, an angle between: (i) the pointing direction; and (ii) a signal source direction of the signal wherein the angle is a first estimation of the pointing direction based on the angle;

measuring a physical quantity using at least one of an inertial measurement unit, a gravity sensor, and a magnetometer wherein the physical quantity is a second estimation of the pointing direction based on the physical quantity; and determining the calibrated pointing direction of the portable device by fusing the first estimation and the second estimation using sensor fusion that is performed by using a Kalman filter pipeline, wherein the fusing of the first estimation and the second estimation using the sensor fusion that is performed by using the Kalman filter pipeline further comprises: implementing a prediction performance model to quantify an error in the angle of the first estimation; and reducing the error in the angle of the first estimation by performing a functional error analysis using the second estimation.

21. The method of claim 20, further comprising:
determining a first angular velocity measurement using the angle;
determining a second angular velocity measurement using the physical quantity; and
wherein the determining of the calibrated pointing direction uses the first angular velocity measurement and the second angular velocity measurement.

22. The method of claim 20, wherein:
antennas in the set of antennas are ultra-wide band antennas.

* * * * *